US011272490B2

United States Patent
Verma et al.

(10) Patent No.: US 11,272,490 B2
(45) Date of Patent: Mar. 8, 2022

(54) TECHNIQUES FOR CONTROL SIGNALING IN EXTREME HIGH THROUGHPUT ENVIRONMENTS

(71) Applicant: QUALCOMM Incorporated, San Diego, CA (US)

(72) Inventors: Lochan Verma, San Diego, CA (US); Bin Tian, San Diego, CA (US); Sameer Vermani, San Diego, CA (US); Lin Yang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 116 days.

(21) Appl. No.: 16/402,492

(22) Filed: May 3, 2019

(65) Prior Publication Data

US 2019/0373586 A1 Dec. 5, 2019

Related U.S. Application Data

(60) Provisional application No. 62/679,640, filed on Jun. 1, 2018.

(51) Int. Cl.
*H04W 72/04* (2009.01)
*H04B 7/0452* (2017.01)
*H04L 1/00* (2006.01)

(52) U.S. Cl.
CPC ........ *H04W 72/042* (2013.01); *H04B 7/0452* (2013.01); *H04L 1/0057* (2013.01); *H04W 72/046* (2013.01); *H04W 72/048* (2013.01); *H04W 72/0453* (2013.01)

(58) Field of Classification Search
CPC .............. H04W 72/042; H04W 72/046; H04B 7/0452; H04B 7/0697; H04L 1/0057
See application file for complete search history.

(56) References Cited

U.S. PATENT DOCUMENTS

| | | | |
|---|---|---|---|
| 2011/0063991 A1* | 3/2011 | Sampath | H04L 27/2613 370/252 |
| 2016/0316473 A1* | 10/2016 | Wang | H04W 74/0816 |
| 2018/0227952 A1* | 8/2018 | Kim | H04W 74/0816 |
| 2018/0302858 A1* | 10/2018 | Son | H04W 74/08 |
| 2019/0190757 A1* | 6/2019 | Huang | H04L 1/0004 |
| 2019/0349067 A1* | 11/2019 | Huang | H04B 7/0697 |

* cited by examiner

*Primary Examiner* — Charles C Jiang
*Assistant Examiner* — Ryan C Kavleski
(74) *Attorney, Agent, or Firm* — Holland & Hart LLP

(57) ABSTRACT

Techniques for control signaling in extreme high throughput (EHT) environments are described. A message transmitted by an access point (AP) may allocate resources to a plurality of stations (STAs). The AP may be configured to allocate up to 320 MHz of total bandwidth or up to sixteen spatial streams to one or more STAs. In some multiple-user multiple-input multiple-output (MU-MIMO) cases, the spatial configuration field may include a starting spatial stream field and a spatial stream number field. In some non-MU-MIMO cases, the spatial configuration field may be expanded by one bit or more. In some cases, content channels of a resource unit (RU) allocation table may span a frequency segment of 40 MHz.

30 Claims, 22 Drawing Sheets

Figure 2A

200 →
- 204: L-STF
- 206: L-LTF
- 208: L-SIG
- 210: VHT-SIG-A
- 212: VHT-STF
- 214: VHT-LTFs
- 216: VHT-SIG-B
- 218: Data

202: {L-STF, L-LTF, L-SIG}

Figure 2B

220 →
- 224: L-STF (×4)
- 226: L-LTF (×4)
- 228: L-SIG (×4)
- 230: RL-SIG (×4)
- 232: HE-SIG-A (×4)
- 234: HE-SIG-B
- 236: HE-STF
- 238: HE-LTFs
- 240: Data

222: {L-STF, L-LTF, L-SIG, RL-SIG, HE-SIG-A}

TECHNIQUES FOR CONTROL SIGNALING IN EXTREME HIGH THROUGHPUT ENVIRONMENTS

CROSS REFERENCE

The present Application for Patent claims the benefit of U.S. Provisional Patent Application No. 62/679,640 by VERMA, et al., entitled "TECHNIQUES FOR CONTROL SIGNALING IN EXTREMELY HIGH THROUGHPUT ENVIRONMENTS," filed Jun. 1, 2018, assigned to the assignee hereof, and which is expressly incorporated by reference in its entirety herein.

TECHNICAL FIELD

This disclosure relates generally to wireless communications, and more specifically, to control signaling in extreme high throughput (EHT) environments.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the 802.11 family of standards is a Basic Service Set (BSS), which is managed by an AP. Each BSS is identified by a service set identifier (SSID) that is advertised by the AP. An AP periodically broadcasts beacon frames to enable any STAs within wireless range of the AP to establish or maintain a communication link with the WLAN. In a typical WLAN, each STA may be associated with only one AP at a time. To identify an AP with which to associate, a STA is configured to perform scans on the wireless channels of each of one or more frequency bands (for example, the 2.4 GHz band or the 5 GHz band). As a result of the increasing ubiquity of wireless networks, a STA may have the opportunity to select one of many WLANs within range of the STA or select among multiple APs that together form an extended BSS. After association with an AP, a STA also may be configured to periodically scan its surroundings to find a more suitable AP with which to associate. For example, a STA that is moving relative to its associated AP may perform a "roaming" scan to find an AP having more desirable network characteristics such as a greater received signal strength indicator (RSSI).

Wireless communication systems are widely deployed to provide various types of communication content such as voice, video, packet data, messaging, broadcast, and so on. These systems may be multiple-access systems capable of supporting communication with multiple users by sharing the available system resources (for example, time, frequency, and space). The AP may be coupled to a network, such as the Internet, and may enable a station to communicate via the network including communicating with other devices coupled to the AP.

Some wireless communication systems may be configured to exchange messages in an extreme high throughput (EHT) environments which may provide additional capabilities over other environments (for example, high efficiency (HE) environments). EHT environments may allow additional spatial streams to be allocated to STAs.

SUMMARY

The systems, methods and devices of this disclosure each have several innovative aspects, no single one of which is solely responsible for the desirable attributes disclosed herein.

A method of wireless communication is described. The method performed by a wireless communication device may include receiving a message allocating resources for communication with an access point, determining a compression mode of at least a portion of the message, determining a starting spatial stream allocated to the wireless communication device by the message based on the compression mode, determining a number of spatial streams allocated to the wireless communication device by the message based on the compression mode, and communicating with the access point based on the starting spatial stream and the number of spatial streams allocated to the wireless communication device by the message.

An apparatus for wireless communication is described. The apparatus may include a processor, memory in electronic communication with the processor, and instructions stored in the memory. The instructions may be executable by the processor to cause the apparatus to receive a message allocating resources for communication with an access point, determine a compression mode of at least a portion of the message, determine a starting spatial stream allocated to the wireless communication device by the message based on the compression mode, determine a number of spatial streams allocated to the wireless communication device by the message based on the compression mode, and communicate with the access point based on the starting spatial stream and the number of spatial streams allocated to the wireless communication device by the message.

Another apparatus for wireless communication is described. The apparatus may include means for receiving a message allocating resources for communication with an access point, determining a compression mode of at least a portion of the message, determining a starting spatial stream allocated to the wireless communication device by the message based on the compression mode, determining a number of spatial streams allocated to the wireless communication device by the message based on the compression mode, and communicating with the access point based on the starting spatial stream and the number of spatial streams allocated to the wireless communication device by the message.

A non-transitory computer-readable medium storing code for wireless communication is described. The code may include instructions executable by a processor to receive a message allocating resources for communication with an access point, determine a compression mode of at least a portion of the message, determine a starting spatial stream allocated to the wireless communication device by the message based on the compression mode, determine a number of spatial streams allocated to the wireless communication device by the message based on the compression mode, and communicate with the access point based on the starting spatial stream and the number of spatial streams allocated to the wireless communication device by the message.

Some examples of the method, apparatuses, and non-transitory computer-readable medium described herein may further include operations, features, means, or instructions for identifying a starting spatial stream field in the message, where determining the starting spatial stream includes identifying the starting spatial stream based on the starting spatial stream field.

Some examples of the method, apparatuses, and non-transitory computer-readable medium described herein may further include operations, features, means, or instructions for identifying a spatial stream number field in the message, where determining the number of spatial streams includes identifying the number of spatial streams based on the spatial stream number field.

Some examples of the method, apparatuses, and non-transitory computer-readable medium described herein may further include operations, features, means, or instructions for determining that the message includes an extreme high throughput (EHT) message, where determining the starting spatial stream and determining the number of spatial streams may be based on determining that the message may be the EHT message. Some examples of the method, apparatuses, and non-transitory computer-readable medium described herein may further include operations, features, means, or instructions for interpreting the message based on the message being the EHT message and the compression mode.

In some examples of the method, apparatuses, and non-transitory computer-readable medium described herein the message may include a user-specific field for allocating MU-MIMO resources to the wireless communication device. In some examples of the method, apparatuses, and non-transitory computer-readable medium described herein, the user-specific field may include a station identifier field that identifies the wireless communication device, a modulation and coding scheme (MCS) field, a starting spatial stream field that indicates an identifier of the starting spatial stream allocated to the wireless communication device and a spatial stream number field that indicates the number of spatial streams allocated to the wireless communication device.

In some examples of the method, apparatuses, and non-transitory computer-readable medium described herein, the starting spatial stream field includes four bits. In some examples of the method, apparatuses, and non-transitory computer-readable medium described herein, the spatial stream number field includes two bits.

In some examples of the method, apparatuses, and non-transitory computer-readable medium described herein, the user-specific field includes a portion of a SIG-B field of a multiple user physical layer convergence procedure protocol data unit (MU PPDU). In some examples of the method, apparatuses, and non-transitory computer-readable medium described herein, the portion of the message may be a SIG-B field.

Some examples of the method, apparatuses, and non-transitory computer-readable medium described herein may further include operations, features, means, or instructions for determining that a SIG-B common field may be absent from the message based on the compression mode of the message.

Some examples of the method, apparatuses, and non-transitory computer-readable medium described herein may further include operations, features, means, or instructions for determining that a coding field may be absent from a user-specific field of the message associated with the wireless communication device based on the message being an EHT message and the compression mode and determining that the resources use a low-density parity-check code (LDPC) based on determining that the message the coding field may be absent from the message, where communicating with the access point may be based on determining that the resources use the LDPC.

Some examples of the method, apparatuses, and non-transitory computer-readable medium described herein may further include operations, features, means, or instructions for determining that a bandwidth of the resources being allocated by the message exceeds 160 MHz, where determining the starting spatial stream and determining the number of spatial streams may be based on determining that the bandwidth of the resources being allocated by the message exceeds 160 MHz.

Some examples of the method, apparatuses, and non-transitory computer-readable medium described herein may further include operations, features, means, or instructions for determining that a number of wireless communication devices being allocated resources by the message exceeds eight wireless communication devices, where determining the starting spatial stream and determining the number of spatial streams may be based on determining that the number of wireless communication devices being allocated resources by the message exceeds eight wireless communication devices.

Some examples of the method, apparatuses, and non-transitory computer-readable medium described herein may further include operations, features, means, or instructions for determining that a number of spatial streams allocatable by the message exceeds eight spatial streams, where determining the starting spatial stream and determining the number of spatial streams may be based on determining that the number of spatial streams allocatable by the message exceeds eight spatial streams.

A method of wireless communication is described. The method performed by a wireless communication device may include receiving an EHT message allocating resources for communication with an access point, determining a compression mode of at least a portion of the EHT message, determining a number of spatial streams allocated to the wireless communication device by the message based on the compression mode, and communicating with the access point based on the number of spatial streams allocated to the wireless communication device by the EHT message.

An apparatus for wireless communication is described. The apparatus may include a processor, memory in electronic communication with the processor, and instructions stored in the memory. The instructions may be executable by the processor to cause the apparatus to receive an EHT message allocating resources for communication with an access point, determine a compression mode of at least a portion of the EHT message, determine a number of spatial streams allocated to the wireless communication device by the message based on the compression mode, and communicate with the access point based on the number of spatial streams allocated to the wireless communication device by the EHT message.

Another apparatus for wireless communication is described. The apparatus may include means for receiving an EHT message allocating resources for communication with an access point, determining a compression mode of at least a portion of the EHT message, determining a number of spatial streams allocated to the wireless communication device by the message based on the compression mode, and communicating with the access point based on the number of spatial streams allocated to the wireless communication device by the EHT message.

A non-transitory computer-readable medium storing code for wireless communication is described. The code may include instructions executable by a processor to receive an EHT message allocating resources for communication with an access point, determine a compression mode of at least a portion of the EHT message, determine a number of spatial streams allocated to the wireless communication device by the message based on the compression mode, and communicate with the access point based on the number of spatial streams allocated to the wireless communication device by the EHT message.

In some examples of the method, apparatuses, and non-transitory computer-readable medium described herein the message may include a user-specific field for allocating MU-MIMO resources to the wireless communication device. In some examples of the method, apparatuses, and non-transitory computer-readable medium described herein, the user-specific field may include a station identifier field that identifies the wireless communication device, a beamforming field, an MCS field, a dual code modulation field and a spatial stream field that indicates the number of spatial streams allocated to the wireless communication device. In some examples of the method, apparatuses, and non-transitory computer-readable medium described herein, the spatial stream field includes four bits.

Some examples of the method, apparatuses, and non-transitory computer-readable medium described herein may further include operations, features, means, or instructions for determining a default error correcting code based on the user-specific field, where communicating with the access point may be based on the default error correcting code.

In some examples of the method, apparatuses, and non-transitory computer-readable medium described herein, the default error correcting code includes a LDPC or a block check character (BCC) code. In some examples of the method, apparatuses, and non-transitory computer-readable medium described herein the message may include a user-specific field for allocating MU-MIMO resources to the wireless communication device. In some examples of the method, apparatuses, and non-transitory computer-readable medium described herein, the user-specific field may include a station identifier field that identifies the wireless communication device, a beamforming field, an MCS field, a coding field and a spatial stream field that indicates the number of spatial streams allocated to the wireless communication device. In some examples of the method, apparatuses, and non-transitory computer-readable medium described herein, the spatial stream field includes four bits.

Some examples of the method, apparatuses, and non-transitory computer-readable medium described herein may further include operations, features, means, or instructions for determining a default setting of a dual code modulation (DCM) scheme for the resources allocated to the wireless communication device, where communicating with the access point may be based on the default setting of the DCM scheme.

In some examples of the method, apparatuses, and non-transitory computer-readable medium described herein, the default setting includes refraining from performing the DCM scheme.

Some examples of the method, apparatuses, and non-transitory computer-readable medium described herein may further include operations, features, means, or instructions for determining that a SIG-B common field may be included in the EHT message based on determining the compression mode of the message.

Some examples of the method, apparatuses, and non-transitory computer-readable medium described herein may further include operations, features, means, or instructions for interpreting the EHT message based on the compression mode, where determining the number of spatial streams allocated to the wireless communication device may be based on the interpretation.

In some examples of the method, apparatuses, and non-transitory computer-readable medium described herein, the portion of the message includes a SIG-B field.

Some examples of the method, apparatuses, and non-transitory computer-readable medium described herein may further include operations, features, means, or instructions for determining that a bandwidth of the resources being allocated by the EHT message may be equal to or less than 160 MHz, where determining the number of spatial streams may be based on determining that the bandwidth of the resources being allocated by the EHT message may be equal to or less than 160 MH.

Some examples of the method, apparatuses, and non-transitory computer-readable medium described herein may further include operations, features, means, or instructions for determining that a number of spatial streams allocatable by the EHT message exceeds eight spatial streams, where determining the number of spatial streams may be based on determining that the number of spatial streams allocatable by the EHT message exceeds eight spatial streams.

A method of wireless communication is described. The method may include receiving an EHT message allocating resources for communication with an access point, determining that the EHT message includes a SIG-B common field including a set of content channels, identifying information included in each content channel of the set of content channels based on the EHT message including the SIG-B common field, each content channel spanning a frequency segment, and communicating with the access point based on identifying the information included in each content channel of the set of content channels.

An apparatus for wireless communication is described. The apparatus may include a processor, memory in electronic communication with the processor, and instructions stored in the memory. The instructions may be executable by the processor to cause the apparatus to receive an EHT message allocating resources for communication with an access point, determine that the EHT message includes a SIG-B common field including a set of content channels, identify information included in each content channel of the set of content channels based on the EHT message including the SIG-B common field, each content channel spanning a frequency segment, and communicate with the access point based on identifying the information included in each content channel of the set of content channels.

Another apparatus for wireless communication is described. The apparatus may include means for receiving an EHT message allocating resources for communication with an access point, determining that the EHT message includes a SIG-B common field including a set of content channels, identifying information included in each content channel of the set of content channels based on the EHT message including the SIG-B common field, each content channel spanning a frequency segment, and communicating with the access point based on identifying the information included in each content channel of the set of content channels.

A non-transitory computer-readable medium storing code for wireless communication is described. The code may include instructions executable by a processor to receive an EHT message allocating resources for communication with an access point, determine that the EHT message includes a SIG-B common field including a set of content channels, identify information included in each content channel of the set of content channels based on the EHT message including the SIG-B common field, each content channel spanning a frequency segment, and communicate with the access point based on identifying the information included in each content channel of the set of content channels.

Some examples of the method, apparatuses, and non-transitory computer-readable medium described herein may further include operations, features, means, or instructions for determining the frequency segment spanned by each content channel of the set of content channels, where identifying the information included in each content channel may be based on determining the frequency segment.

In some examples of the method, apparatuses, and non-transitory computer-readable medium described herein, the frequency segment spanned by each content channel of the set of content channels may be 40 MHz.

Some examples of the method, apparatuses, and non-transitory computer-readable medium described herein may further include operations, features, means, or instructions for determining whether a number of tones in an RU satisfies a threshold and applying MU-MIMO to the RU that satisfies the threshold.

In some examples of the method, apparatuses, and non-transitory computer-readable medium described herein, the threshold includes 242 tones.

Some examples of the method, apparatuses, and non-transitory computer-readable medium described herein may further include operations, features, means, or instructions for determining a compression mode of the EHT message, where determining that the EHT message include the SIG-B common field may be based on determining the compression mode.

Some examples of the method, apparatuses, and non-transitory computer-readable medium described herein may further include operations, features, means, or instructions for interpreting the EHT message based on the compression mode and determining a number of spatial streams allocated to the wireless communication device by the message based on the interpretation, where determining that the EHT message include the SIG-B common field is based on determining the number of spatial streams.

Some examples of the method, apparatuses, and non-transitory computer-readable medium described herein may further include operations, features, means, or instructions for determining that a bandwidth of the resources being allocated by the message exceeds 160 MHz, where identifying the information included in each content channel of the set of content channels may be based on determining that the bandwidth of the resources being allocated by the message exceeds 160 MHz.

Some examples of the method, apparatuses, and non-transitory computer-readable medium described herein may further include operations, features, means, or instructions for determining a portion of an RU allocation table associated with the EHT message, where identifying the information included in each content channel may be based on the portion of the RU allocation table associated with the EHT message.

In some examples of the method, apparatuses, and non-transitory computer-readable medium described herein, the EHT message may include a user-specific field for allocating resources to the wireless communication device. In some examples of the method, apparatuses, and non-transitory computer-readable medium described herein, the user-specific field may include a station identifier field that identifies the wireless communication device, a beamforming field, an MCS field, a dual code modulation field, and a spatial stream field that indicates the number of spatial streams allocated to the wireless communication device.

In some examples of the method, apparatuses, and non-transitory computer-readable medium described herein, the EHT message may include a user-specific field for allocating non-multiple user multiple in multiple out (non-MU-MIMO) resources to the wireless communication device. In some examples of the method, apparatuses, and non-transitory computer-readable medium described herein, the user-specific field may include a station identifier field that identifies the wireless communication device, a beamforming field, an MCS field, a coding field, and a spatial stream field that indicates the number of spatial streams allocated to the wireless communication device.

Some examples of the method, apparatuses, and non-transitory computer-readable medium described herein may further include operations, features, means, or instructions for determining that a bandwidth of the resources being allocated by the EHT message is equal to or less than 160 MHz, where identifying the information included in each content channel of the set of content channels is based on determining that the bandwidth of the resources being allocated by the EHT message is equal to or less than 160 MHz.

Some examples of the method, apparatuses, and non-transitory computer-readable medium described herein may further include operations, features, means, or instructions for determining that a number of spatial streams allocatable by the EHT message exceeds eight spatial streams, where identifying the information included in each content channel of the set of content channels is based on determining that the number of spatial streams allocatable by the EHT message exceeds eight spatial streams A method of wireless communication is described. The method may include receiving a message allocating resources for communication with an access point, identifying a first bandwidth field of the message that indicates that a bandwidth of the resources allocated by the message exceeds a threshold frequency, determining that the bandwidth of the resources being allocated by the message exceeds the threshold frequency based on the first bandwidth field, and communicating with the access point based on determining that the bandwidth of the resources being allocated by the message exceeds the threshold frequency.

An apparatus for wireless communication is described. The apparatus may include a processor, memory in electronic communication with the processor, and instructions stored in the memory. The instructions may be executable by the processor to cause the apparatus to receive a message allocating resources for communication with an access point, identify a first bandwidth field of the message that indicates that a bandwidth of the resources allocated by the message exceeds a threshold frequency, determine that the bandwidth of the resources being allocated by the message exceeds the threshold frequency based on the first bandwidth field, and communicate with the access point based on determining that the bandwidth of the resources being allocated by the message exceeds the threshold frequency.

Another apparatus for wireless communication is described. The apparatus may include means for receiving a message allocating resources for communication with an access point, identifying a first bandwidth field of the message that indicates that a bandwidth of the resources allocated by the message exceeds a threshold frequency, determining that the bandwidth of the resources being allocated by the message exceeds the threshold frequency based on the first bandwidth field, and communicating with the access point based on determining that the bandwidth of the resources being allocated by the message exceeds the threshold frequency.

A non-transitory computer-readable medium storing code for wireless communication is described. The code may include instructions executable by a processor to receive a message allocating resources for communication with an access point, identify a first bandwidth field of the message that indicates that a bandwidth of the resources allocated by the message exceeds a threshold frequency, determine that the bandwidth of the resources being allocated by the message exceeds the threshold frequency based on the first bandwidth field, and communicate with the access point based on determining that the bandwidth of the resources being allocated by the message exceeds the threshold frequency.

Some examples of the method, apparatuses, and non-transitory computer-readable medium described herein may further include operations, features, means, or instructions for identifying a second bandwidth field of the message configured to indicate the bandwidth of the resources being allocated by the message when the first bandwidth field indicates that the bandwidth may be less than or equal to the threshold frequency and configured to indicate a puncture mode of the resources allocated by the message when the first bandwidth field indicates that the bandwidth exceeds the threshold frequency.

Some examples of the method, apparatuses, and non-transitory computer-readable medium described herein may further include operations, features, means, or instructions for determining the puncture mode of the resources allocated by the message based on identifying the second bandwidth field.

In some examples of the method, apparatuses, and non-transitory computer-readable medium described herein, the second bandwidth field includes up to three bits. In some examples of the method, apparatuses, and non-transitory computer-readable medium described herein, the second bandwidth field includes a portion of a SIG-A field.

In some examples of the method, apparatuses, and non-transitory computer-readable medium described herein, the threshold frequency may be 160 MHz. In some examples of the method, apparatuses, and non-transitory computer-readable medium described herein, the first bandwidth field includes one bit. In some examples of the method, apparatuses, and non-transitory computer-readable medium described herein, the first bandwidth field includes a portion of a SIG-A field.

Some examples of the method, apparatuses, and non-transitory computer-readable medium described herein may further include operations, features, means, or instructions for determining a default setting for spatial reuse of the resources allocated by the message based on the first bandwidth field in the message, where communicating with the access point may be based on the default setting for the spatial reuse.

Some examples of the method, apparatuses, and non-transitory computer-readable medium described herein may further include operations, features, means, or instructions for determining that the message includes an EHT message based on the first bandwidth field indicating that the bandwidth exceeds the threshold frequency, where communicating with the access point may be based on determining that the message includes the EHT message.

In some examples of the method, apparatuses, and non-transitory computer-readable medium described herein, the bandwidth of the resources allocated by the message may be 320 MHz.

A method of wireless communication is described. The method may include receiving a message allocating resources for communication with an access point, determining that a bandwidth of the resources being allocated by the message exceeds a threshold frequency, determining that the message includes a SIG-B common field including a first content channel spanning a first frequency segment, identifying a first subband of the first content channel that spans a second frequency segment that is smaller than the first frequency segment, determining an RU allocation for the first content channel based on the first subband, and communicating with the access point based on determining the RU allocation for the first content channel.

An apparatus for wireless communication is described. The apparatus may include a processor, memory in electronic communication with the processor, and instructions stored in the memory. The instructions may be executable by the processor to cause the apparatus to receive a message allocating resources for communication with an access point, determine that a bandwidth of the resources being allocated by the message exceeds a threshold frequency, determine that the message includes a SIG-B common field including a first content channel spanning a first frequency segment, identify a first subband of the first content channel that spans a second frequency segment that is smaller than the first frequency segment, determine an RU allocation for the first content channel based on the first subband, and communicate with the access point based on determining the RU allocation for the first content channel.

Another apparatus for wireless communication is described. The apparatus may include means for receiving a message allocating resources for communication with an access point, determining that a bandwidth of the resources being allocated by the message exceeds a threshold frequency, determining that the message includes a SIG-B common field including a first content channel spanning a first frequency segment, identifying a first subband of the first content channel that spans a second frequency segment that is smaller than the first frequency segment, determining an RU allocation for the first content channel based on the first subband, and communicating with the access point based on determining the RU allocation for the first content channel.

A non-transitory computer-readable medium storing code for wireless communication is described. The code may include instructions executable by a processor to receive a message allocating resources for communication with an access point, determine that a bandwidth of the resources being allocated by the message exceeds a threshold frequency, determine that the message includes a SIG-B common field including a first content channel spanning a first frequency segment, identify a first subband of the first content channel that spans a second frequency segment that is smaller than the first frequency segment, determine an RU allocation for the first content channel based on the first subband, and communicate with the access point based on determining the RU allocation for the first content channel.

Some examples of the method, apparatuses, and non-transitory computer-readable medium described herein may further include operations, features, means, or instructions for identifying a second subband of a second content channel of the SIG-B common field, the second content channel spanning a third frequency segment and the second subband spanning a fourth frequency segment that may be smaller than the third frequency segment and determining an RU allocation for the second content channel based on the second subband, where communicating with the access point may be based on determining the RU allocation for the second content channel.

Some examples of the method, apparatuses, and non-transitory computer-readable medium described herein may further include operations, features, means, or instructions for determining a puncture mode associated with the resources allocated by the message, where identifying the second subband of the second content channel further includes.

Some examples of the method, apparatuses, and non-transitory computer-readable medium described herein may further include operations, features, means, or instructions for determining a puncture mode associated with the resources allocated by the message and determining whether an RU allocation for a second content channel of the SIG-B common field may be included in a second subband of the first content channel or in a third subband of the second content channel based on determining the puncture mode, where communicating with the access point may be based on determining whether the RU allocation for the second content channel may be included in the second subband of the first content channel or in the third subband of the second content channel.

Some examples of the method, apparatuses, and non-transitory computer-readable medium described herein may further include operations, features, means, or instructions for determining the RU allocation for the second content channel using either the second subband or the third subband based on determining whether the RU allocation for the second content channel may be included in the second subband of the first content channel or in the third subband of the second content channel, where communicating with the access point may be based on determining the RU allocation for the second content channel.

In some examples of the method, apparatuses, and non-transitory computer-readable medium described herein, the first frequency segment may be 40 MHz and the second frequency segment may be 20 MHz.

In some examples of the method, apparatuses, and non-transitory computer-readable medium described herein, the first content channel includes the first subband spanning the second frequency segment and a second subband spanning a third frequency segment that may be smaller than the first frequency segment and a second content channel of the SIG-B common field that spans a fourth frequency segment includes a third subband spanning a fifth frequency segment smaller than the fourth frequency segment and a fourth subband spanning a sixth frequency that may be smaller than the fourth frequency segment.

In some examples of the method, apparatuses, and non-transitory computer-readable medium described herein, the first subband of the first content channel and the third subband of the second content channel include RU allocations for the first content channel and the second subband of the first content channel and the fourth subband of the second content channel include RU allocations for the second content channel.

In some examples of the method, apparatuses, and non-transitory computer-readable medium described herein, the first subband, the second subband, the third subband, and the fourth subband of the SIG-B common field include a [1 2 1 2] structure.

In some examples of the method, apparatuses, and non-transitory computer-readable medium described herein, the first subband of the first content channel and the second subband of the first content channel include RU allocations for the first content channel and the third subband of the second content channel and the fourth subband of the second content channel include RU allocations for the second content channel.

In some examples of the method, apparatuses, and non-transitory computer-readable medium described herein, the first subband, the second subband, the third subband, and the fourth subband of the SIG-B common field include a [1 1 2 2] structure.

In some examples of the method, apparatuses, and non-transitory computer-readable medium described herein, the threshold frequency may be 160 MHz.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A shows an example frame usable for communications between an access point (AP) and a number of stations (STAs) according to some implementations.

FIG. 2B shows an example frame usable for communications between an AP and a number of STAs according to some implementations.

Like reference numbers and designations in the various drawings indicate like elements.

DETAILED DESCRIPTION

Figure 1:
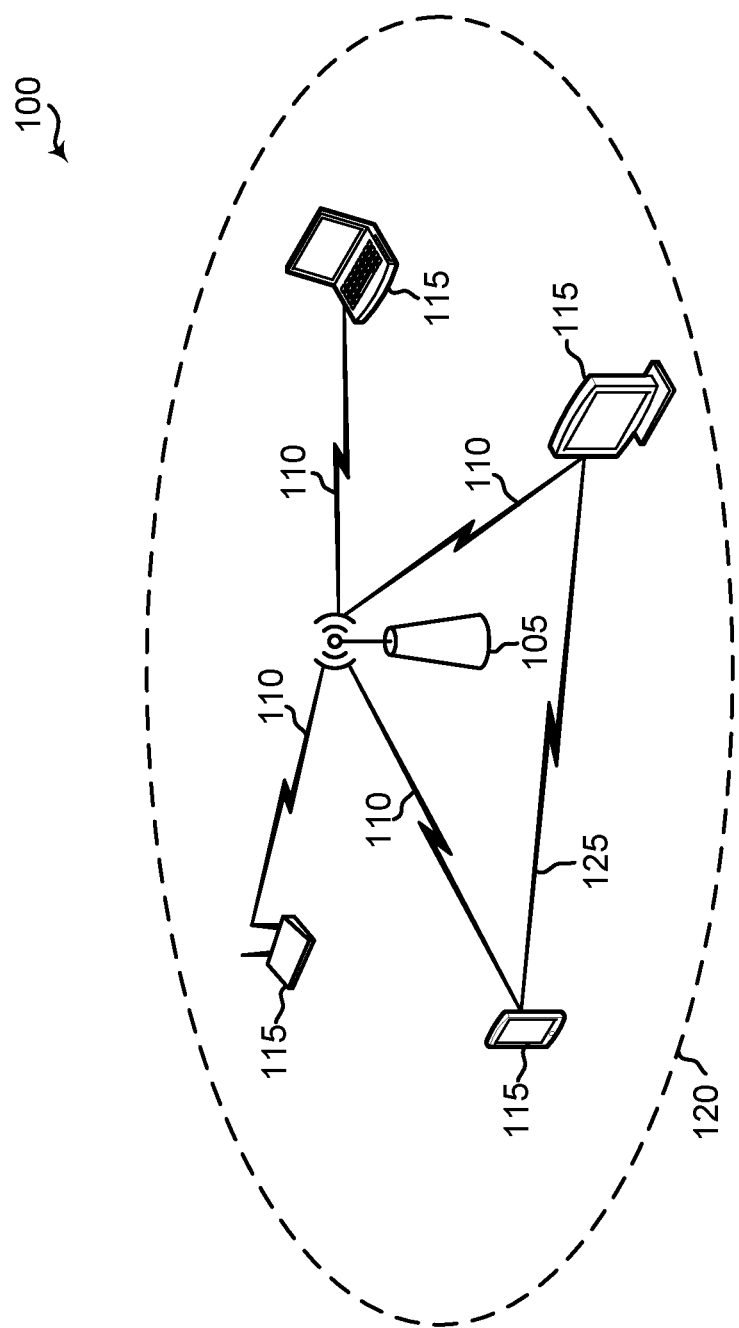
FIG. 1 shows a block diagram of an example wireless communication system according to some implementations.

The following description is directed to particular implementations for the purposes of describing innovative aspects of this disclosure. However, a person having ordinary skill in the art will readily recognize that the teachings herein may be applied in a multitude of different ways. The described implementations may be implemented in any device, system or network that is capable of transmitting and receiving radio frequency (RF) signals according to any of the IEEE 802.11 standards, or the Bluetooth® standards. The described implementations also may be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

In some wireless communication systems, extreme high throughput (EHT) environments may provide additional capabilities over other environments (for example, high efficiency (HE) environments). For example, EHT environments may be configured to allow communications to have a total bandwidth of up to 320 MHz and up to sixteen spatial streams allocated to a plurality of stations (STAs) by an access point (AP). The additional capabilities may need additional control signaling, in some implementations. Additional control signaling, however, may reduce the amount of data that may be communicated using some communication resources.

Techniques for control signaling in EHT environments are described. A message transmitted by an AP may allocate resources to a set of STAs. The AP may be configured to allocate up to 320 MHz of total bandwidth or up to sixteen spatial streams to one or more STAs. To allocate up to sixteen spatial streams to the plurality of STAs, one or more fields related to spatial stream configurations in a message may be expanded as compared to other environments (for example, HE environment). In some multiple-user multiple-input multiple-output (MU-MIMO) implementations, spatial configuration field may include a starting spatial stream field and a spatial stream number field. In some non-MU-MIMO implementations, the spatial configuration field may be expanded by one bit or more. In some implementations, content channels of a resource unit (RU) allocation table may span a frequency segment of 40 MHz.

FIG. 1 shows a block diagram of an example wireless communication system 100. According to some aspects, the wireless communication system 100 may be an example of a wireless local area network (WLAN) (and will hereinafter be referred to as WLAN 100). For example, the WLAN 100 may be a network implementing at least one of the IEEE 802.11 family of standards. The WLAN 100 may include numerous wireless communication devices such as an AP 105 and multiple associated STAs 115. Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), printers, key fobs (for example, for passive keyless entry and start (PKES) systems), among other possibilities.

Each of the STAs 115 may associate and communicate with the AP 105 via a communication link 110. The various STAs 115 in the network are able to communicate with one another through the AP 105. A single AP 105 and an associated set of STAs 115 may be referred to as a basic service set (BSS). FIG. 1 additionally shows an example coverage area 120 of the AP 105, which may represent a basic service area (BSA) of the WLAN 100. While only one AP 105 is shown, the WLAN 100 may include multiple APs 105. An extended service set (ESS) may include a set of connected BSSs. An extended network station associated with the WLAN 100 may be connected to a wired or wireless distribution system that may allow multiple APs 105 to be connected in such an ESS. As such, a STA 115 may be covered by more than one AP 105 and may associate with different APs 105 at different times for different transmissions.

STAs 115 may function and communicate (via the respective communication links 110) according to the IEEE 802.11 family of standards and amendments including, but not limited to, 802.11a, 802.11b, 802.11g, 802.11n, 802.11ac, 802.11ad, 802.11ah, 802.11ay, 802.11ax, 802.11az, and 802.11ba. These standards define the WLAN radio and baseband protocols for the physical (PHY) and medium access control (MAC) layers. The wireless communication devices in the WLAN 100 may communicate over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. The unlicensed spectrum may also include other frequency bands, such as the emerging 6 GHz band. The wireless communication devices in the WLAN 100 also may be configured to communicate over other frequency bands such as shared licensed frequency bands, where multiple operators may have a license to operate in the same or overlapping frequency band or bands.

In some implementations, STAs 115 may form networks without APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some implementations, ad hoc networks may be implemented within a larger wireless network such as the WLAN 100. In such implementations, while the STAs 115 may be capable of communicating with each other through the AP 105 using communication links 110, STAs 115 also may communicate directly with each other via direct wireless communication links 125. Additionally, two STAs 115 may communicate via a direct communication link 125 regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless communication links 125 include Wi-Fi Direct connections, connections established by using a Wi-Fi Tunneled Direct Link Setup (TDLS) link, and other P2P group connections.

Some types of STAs 115 may provide for automated communication. Automated wireless communication devices may include those implementing IoT communication, Machine-to-Machine (M2M) communication, or machine type communication (MTC). IoT, M2M or MTC may refer to data communication technologies that allow devices to communicate without human intervention. For example, IoT, M2M or MTC may refer to communications from STAs 115 that integrate sensors or meters to measure or capture information and relay that information to a central server or application program that may make use of the information or present the information to humans interacting with the program or application.

Some of STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

WLAN 100 may support beamformed transmissions. As an example, AP 105 may use multiple antennas or antenna arrays to conduct beamforming operations for directional communications with a STA 115. Beamforming (which may also be referred to as spatial filtering or directional transmission) is a signal processing technique that may be used at a transmitter (for example, AP 105) to shape or steer an overall antenna beam in the direction of a target receiver (for example, a STA 115). Beamforming may be achieved by combining elements in an antenna array in such a way that transmitted signals at particular angles experience constructive interference while others experience destructive interference. In some implementations, the ways in which the elements of the antenna array are combined at the transmitter may depend on channel state information (CSI) associated with the channels over which the AP 105 may communicate with the STA 115. That is, based on this CSI, the AP 105 may appropriately weight the transmissions from each antenna (for example, or antenna port) such that the desired beamforming effects are achieved. In some implementations, these weights may be determined before beamforming may be employed. For example, the transmitter (for example, the AP 105) may transmit one or more sounding packets to the receiver in order to determine CSI.

WLAN 100 may further support multiple-input, multiple-output (MIMO) wireless systems. Such systems may use a transmission scheme between a transmitter (for example, AP 105) and a receiver (for example, a STA 115), where both transmitter and receiver are equipped with multiple antennas. For example, AP 105 may have an antenna array with a number of rows and columns of antenna ports that the AP 105 may use for beamforming in its communication with a STA 115. Signals may be transmitted multiple times in different directions (for example, each transmission may be beamformed differently). The receiver (for example, STA 115) may try multiple beams (for example, antenna subarrays) while receiving the signals.

WLAN protocol data units (PDUs) may be transmitted over a radio frequency spectrum band, which in some examples may include multiple sub-bands or frequency channels. In some implementations, the radio frequency spectrum band may have a bandwidth of 80 MHz, and each of the sub-bands or channels may have a bandwidth of 20 MHz. Transmissions to and from STAs 115 and APs 105 typically include control information within a header that is transmitted prior to data transmissions. The information provided in a header is used by a receiving device to decode the subsequent data. A legacy WLAN preamble may include legacy short training field (STF) (L-STF) information, legacy LTF (L-LTF) information, and legacy signaling (L-SIG) information. The legacy preamble may be used for packet detection, automatic gain control and channel estimation, among other uses. The legacy preamble may also be used to maintain compatibility with legacy devices.

WLAN 100 may support PDUs or other messages that communicate control signaling for EHT communications. EHT communications may allow for: higher bandwidths than HE communications, use of more spatial streams, changes in control signaling, or combinations thereof. The PDUs used for EHT communications may be different, in some aspects, from PDUs used for HE communications.

FIG. 2A shows an example frame 200 usable for communications between an AP and each of a number of stations identified by the AP. For example, the frame 200 may be formatted as a very high throughput (VHT) frame in accordance with the IEEE 802.11ac amendment to the IEEE 802.11 set of standards. The frame 200 may include a legacy preamble portion 202 that may include an L-STF 204, an L-LTF 206, and an L-SIG 208. The frame 200 may further include a non-legacy preamble portion that includes a first VHT signaling field (VHT-SIG-A) 210, a VHT short training field (VHT-STF) 212, a number of VHT long training fields (VHT-LTFs) 214 and a second VHT signaling field (VHT-SIG-B) 216. The frame 200 also may include a payload or data portion 218 after the preamble. The data portion 218 may include MAC protocol data units (MPDUs), for example, in the form of an aggregated MPDU (AMPDU).

The frame 200 may be transmitted over a radio frequency spectrum band, which may include a set of sub-bands. For example, the radio frequency spectrum band may have a bandwidth of 80 MHz, and each of the sub-bands may have a bandwidth of 20 MHz. When the radio frequency spectrum band includes a set of sub-bands, the L-STF field 204, L-LTF field 206, and L-SIG field 208 may be duplicated and transmitted in each of the set of sub-bands. The information in the VHT-SIG-A field 210 may also be also duplicated and transmitted in each sub-band.

The VHT-SIG-A field 210 may indicate to a station that the frame 200 is an IEEE 802.11ac frame. The VHT-SIG-A field 210 also may include VHT WLAN signaling information usable by stations other than the number of stations that are identified to receive downlink communications in the frame 200. The VHT-SIG-A field 210 may also include information usable by the identified number of stations to decode the VHT-SIG-B field 216. The VHT-SIG-B field 216 may include VHT WLAN signaling information usable by the number of stations identified to receive downlink communications in the frame 200. More specifically, the VHT-SIG-B field 216 may include information usable by the number of stations to decode data received in the data portion 218. The VHT-SIG-B field 216 may be encoded separately from the VHT-SIG-A field 210. The number of VHT-LTFs 214 depends on the number of transmitted streams.

FIG. 2B shows an example frame 220 usable for communications between an AP and each of a number of stations identified by the AP. For example, the frame 220 may be formatted as a HE frame in accordance with the IEEE 802.11ax amendment to the IEEE 802.11 set of standards. The frame 220 may include a legacy preamble portion 222 that may include an L-STF 224, an L-LTF 226, and an L-SIG 228. The frame 220 may further include a non-legacy preamble portion that may include a repeated legacy signaling field (RL-SIG) 230, a first high efficiency signaling field (HE-SIG-A) 232, a second high efficiency signaling field (HE-SIG-B) 234, a high efficiency short training field (HE-STF) 236 and a number of high efficiency long training fields (HE-LTFs) 238. The frame 220 also may include a payload or data portion 240 after the preamble. The data portion 240 may include MPDUs, for example, in the form of an AMPDU. In some implementations, the high-efficiency fields, such as HE-SIG-A fields 232, HE-SIG-B fields 234, HE-STF fields 236, or HE-LTF fields 238, may be examples of or may include EHT fields. For example, the HE-SIG-A field 232 may be an EHT-SIG-A field, the HE-SIG-B field 234 may be an EHT-SIG-B field, the HE-STF field 236 may be an EHT-STF field, or the HE-LTF field 238 may be an EHT-LTF field, or a combination thereof.

The frame 220 may be transmitted over a radio frequency spectrum band, which may include a set of sub-bands. For example, the radio frequency spectrum band may have a bandwidth of 80 MHz, and each of the sub-bands may have a bandwidth of 20 MHz. When the radio frequency spectrum band includes a set of sub-bands, the L-STF, L-LTF, and L-SIG fields 224, 226 and 228, respectively, may be duplicated and transmitted in each of the set of sub-bands. The information in the RL-SIG field 230 and the HE-SIG-A field 232 is also duplicated and transmitted in each sub-band as shown in FIG. 2B.

The RL-SIG field 230 may indicate to a station that the frame 220 is an IEEE 802.11ax frame. The HE-SIG-A field 232 may include high efficiency WLAN signaling information usable by stations other than the number of stations that are identified to receive downlink communications in the frame 220. The HE-SIG-A field 232 may also include information usable by the identified number of stations to decode the HE-SIG-B field 234. The HE-SIG-B field 234 may include high efficiency WLAN signaling information usable by the number of stations identified to receive downlink communications in the frame 220. More specifically, the HE-SIG-B field 234 may include information usable by the number of stations to decode data received in the data portion 240. The HE-SIG-B field 234 may be encoded separately from the HE-SIG-A field 232. The HE-SIG-A field 232 may, in some implementations, indicate one or more of a bandwidth of resources being allocated, a compression mode of the HE-SIG-B field 234, a number of MU-MIMO user or SIG-B symbols, or a number of spatial streams (Nsts) or HE-LTFs. In some implementations, the HE-SIG-A field 232 may be modified for EHT signaling. In such implementations, the EHT-SIG-A field may indicate that a bandwidth of the resources is up to 320 MHz and that the number of spatial streams is up to sixteen.

In some implementations, a wide bandwidth field of the SIG-A field 232 (for example, an EHT-SIG-A field) may indicate whether the bandwidth of the resources being allocated exceeds a threshold frequency (for example 160 MHz). For example, the wide bandwidth field may be a single bit. The wide bandwidth field may include a first value (for example, 1) indicating that the bandwidth exceeds the threshold frequency (for example, 160 MHz) or may include a second value (for example, 0) indicating that the bandwidth does not exceed the threshold frequency.

In some implementations, the SIG-A field 232 may include a bandwidth field (in addition to the wide bandwidth field) that indicates a bandwidth of the resource being allocated when the bandwidth does not exceed the threshold frequency. The bandwidth field may be an example of a bandwidth field of a HE-SIG-A field. The bandwidth field may indicate whether the bandwidth is 20 MHz, 40 MHz, or 80 MHz. The bandwidth field may include up to three bits.

In some implementations, the wide bandwidth field may indicate a bandwidth of the resources allocated by a message. For example, if the wide bandwidth field includes a first value indicating that the bandwidth exceeds the threshold frequency, the wide bandwidth field may indicate that the bandwidth is a fixed amount, such as 320 MHz. If such is the implementation, the bandwidth field of the SIG-A field may be repurposed to indicate a puncture mode of the resources being allocated. The bandwidth field may indicate whether the resources are not punctured, are punctured according to a first puncturing mode, or are punctured according to a second puncturing mode. In some implementations, two bits of the bandwidth field may be used to indicate the puncturing modes. The STA may be configured to interpret the bandwidth field as either including an indication of bandwidth or an indication of a puncture mode based on the information in the wide bandwidth field.

In some implementations, the wide bandwidth field may include one or more bits repurposed from a modulation and coding scheme (MCS) field in the SIG-B field. In such implementations, the MCS field from the SIG-B field may be two bits instead of three bits. In some implementations, the wide bandwidth field may include one or more bits repurposed from a spatial reuse field of the SIG-A field. In such implementations, MU PPDU may disallow spatial reuse. If this is the implementation, up to four bits may be available to be used by the wide bandwidth field or other fields.

HE WLAN (HEW) preambles may be used to schedule multiple devices, such as STAs 115, for multi-user simultaneous transmissions (for example, using multi-user orthogonal frequency division multiple access (MU-OFDMA) or MU-MIMO techniques). A HEW signaling field may be used to signal a resource allocation pattern to multiple receiving STAs 115. The HEW signaling field may include a common user field that is decodable by multiple STAs 115, as well as a resource allocation field. The resource allocation field may indicate resource unit distributions to multiple STAs 115 and indicate which resource units in a resource unit distribution correspond to MU-MIMO transmissions and which resource units correspond to OFDMA transmissions. The HEW signaling field also may include, subsequent to the common user field, dedicated station-specific signaling fields that are assigned to particular STAs 115 and used to schedule resources and to indicate the scheduling to other WLAN devices.

In some implementations, aspects of transmissions may vary based on a distance between a transmitter (for example, AP 105) and a receiver (for example, STA 115). WLAN 100 may otherwise generally benefit from AP 105 having information regarding the location of the various STAs 115 within coverage area 120. In some examples, relevant distances may be computed using round trip time (RTT)-based ranging procedures. As an example, WLAN 100 may offer such functionality that produces accuracy on the order of one meter (or even centimeter-level accuracy). The same (or similar) techniques employed in WLAN 100 may be applied across other radio access technologies (RATs). For example, such RTT-based ranging functionality may be employed in developing "relative geofencing" applications (that is, applications where there is a geofence relative to an object of interest such as a mobile device, a car, a person, etc.). Various such examples are considered in accordance with aspects of the present disclosure. For example, car keys may employ RTT estimation for PKES systems. RTT-based geofences around an adult may monitor the position of a child within the geofence. Additionally, drone-to-drone and car-to-car RTT functionality may help prevent collisions.

Figure 3:
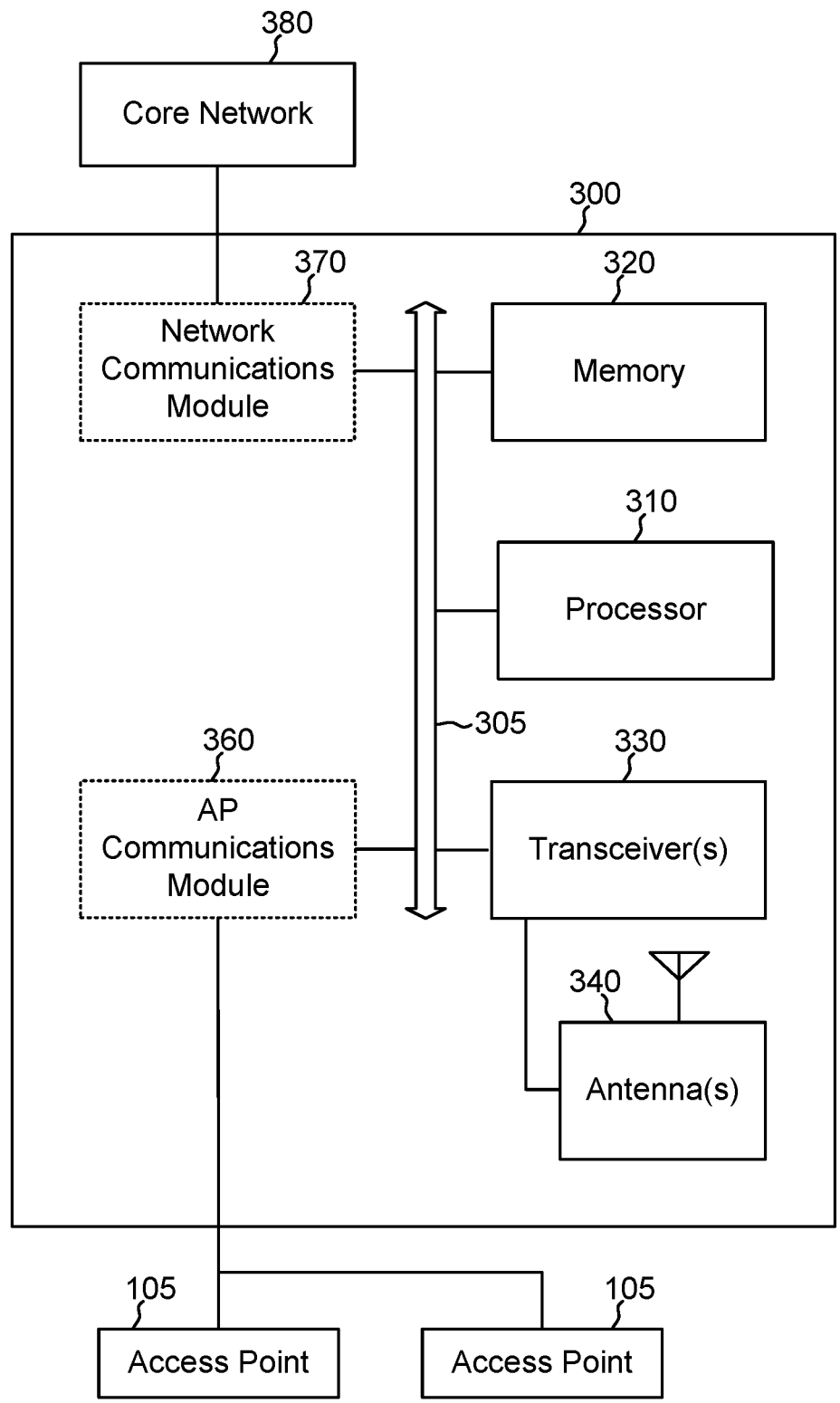
FIG. 3 shows a block diagram of an example AP for use in wireless communication according to some implementations.

FIG. 3 shows a block diagram of an example AP 300 for use in wireless communication. For example, the AP 300 may be an example of aspects of the AP 105 described with reference to FIG. 1. The AP 300 may be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The AP 300 may include a processor 310, a memory 320, at least one transceiver 330 and at least one antenna 340. In some implementations, the AP 300 may also include one or both of an AP communications module 360 and a network communications module 370. Each of the components (or "modules") described with reference to FIG. 3 may communicate with one another, directly or indirectly, over at least one bus 305.

The memory 320 may include random access memory (RAM) and read-only memory (ROM). The memory 320 also may store processor- or computer-executable software code 325 containing instructions that, when executed by the processor 310, cause the processor to perform various functions described herein for wireless communication, including generation and transmission of a downlink frame and reception of an uplink frame.

The processor 310 may include an intelligent hardware device such as, for example, a central processing unit (CPU), a microcontroller, an application-specific integrated circuit (ASIC), or a programmable logic device (PLD) such as an FPGA, among other possibilities. The processor 310 processes information received through the transceiver 330, the AP communications module 360, and the network communications module 370. The processor 310 also may process information to be sent to the transceiver 330 for transmission through the antenna 340, information to be sent to the AP communications module 360, and information to be sent to the network communications module 370. The processor 310 may generally be configured to perform various operations related to generating and transmitting a downlink frame and receiving an uplink frame.

The transceiver 330 may include a modem to modulate packets and provide the modulated packets to the antenna 340 for transmission, as well as to demodulate packets received from the antenna 340. The transceiver 330 may be implemented as at least one RF transmitter and at least one separate RF receiver. The transceiver 330 may communicate bi-directionally, via the antenna 340, with at least one STA 115 as, for example, shown in FIG. 1. Although only one transceiver 330 and one antenna 340 are shown in FIG. 3, the AP 300 may typically include multiple transceivers 330 and antennas 340. For example, in some AP implementations, the AP 300 may include multiple transmit antennas (each with a corresponding transmit chain) and multiple receive antennas (each with a corresponding receive chain). The AP 300 may communicate with a core network 380 through the network communications module 370. The system also may communicate with other APs, such as APs 105, using the AP communications module 360.

In some implementations, the AP 300 may be configured to allocate EHT resources to one or more STAs. Allocation of those EHT resources may include allocating spatial streams to STAs and signaling such allocations to the STAs.

Figure 4:
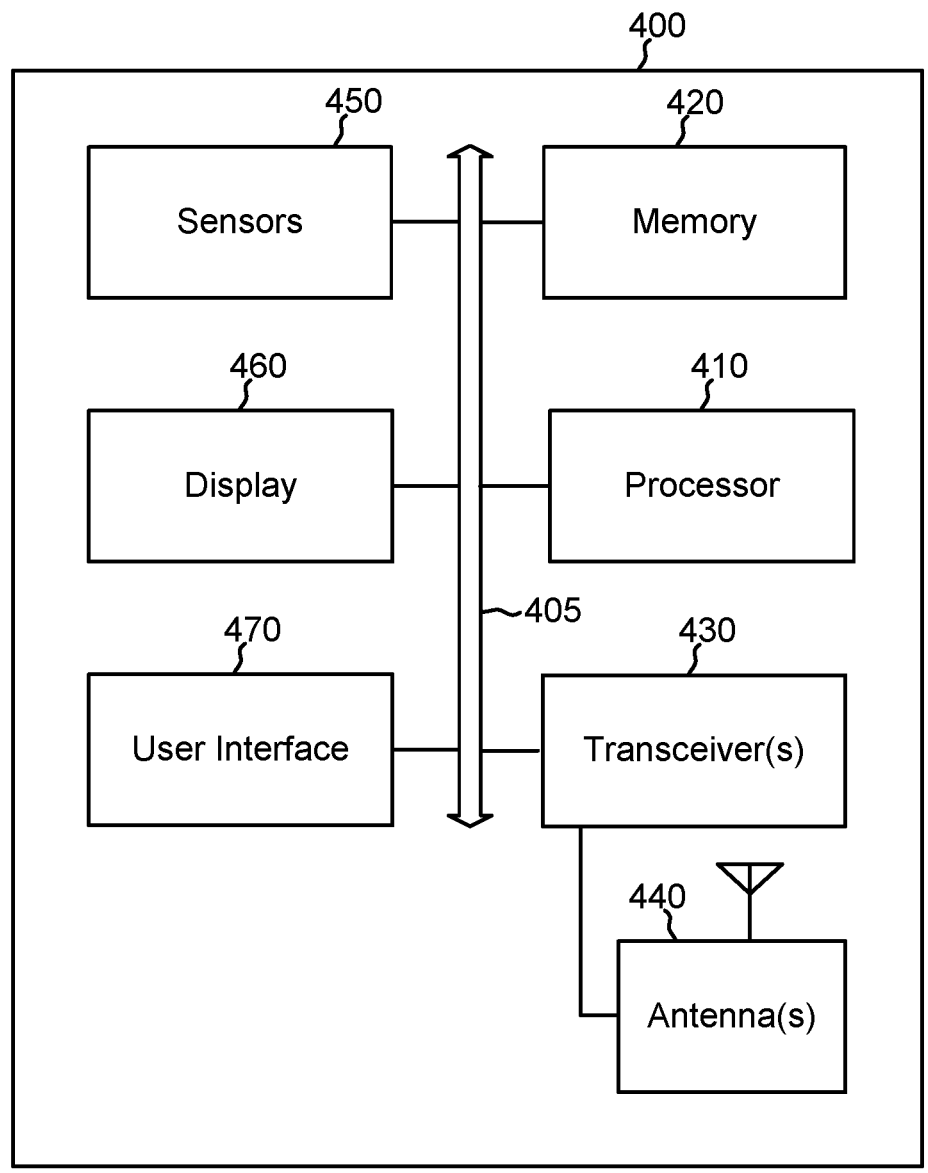
FIG. 4 shows a block diagram of an example STA for use in wireless communication according to some implementations.

FIG. 4 shows a block diagram of an example wireless STA 400 for use in wireless communication. For example, the STA 400 may be an example of aspects of the STA 115 described with reference to FIG. 1. The STA 400 may be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The STA 400 may include a processor 410, a memory 420, at least one transceiver 430 and at least one antenna 440. In some implementations, the STA 400 additionally may include one or more of sensors 450, a display 460 and a user interface (UI) 470 (such as a touchscreen or keypad). Each of the components (or "modules") described with reference to FIG. 4 may communicate with one another, directly or indirectly, over at least one bus 405.

The memory 420 may include RAM and ROM. The memory 420 also may store processor- or computer-executable software code 425 containing instructions that, when executed, cause the processor 410 to perform various functions described herein for wireless communication, including reception of a downlink frame and generation and transmission of an uplink frame.

The processor 410 may include an intelligent hardware device such as, for example, a CPU, a microcontroller, an ASIC or a PLD such as an FPGA, among other possibilities. The processor 410 processes information received through the transceiver 430 as well as information to be sent to the transceiver 430 for transmission through the antenna 440. The processor 410 may be configured to perform various operations related to receiving a downlink frame and generating and transmitting an uplink frame.

The transceiver 430 may include a modem to modulate packets and provide the modulated packets to the antenna 440 for transmission, as well as to demodulate packets received from the antenna 440. The transceiver 430 may be implemented as at least one RF transmitter and at least one separate RF receiver. The transceiver 430 may communicate bi-directionally, via the antenna 440, with at least one AP 105 as, for example, shown in FIG. 1. Although only one transceiver 430 and one antenna 440 are shown in FIG. 4, the STA 400 may include two or more antennas. For example, in some STA implementations, the STA 400 may include multiple transmit antennas (each with a corresponding transmit chain) and multiple receive antennas (each with a corresponding receive chain).

In some implementations, the STA 400 may be configured to use EHT resources. An AP may allocate EHT resources to the STA 400 including allocating spatial streams to the STA 400 and signaling such allocations to the STA 400.

Figure 5:
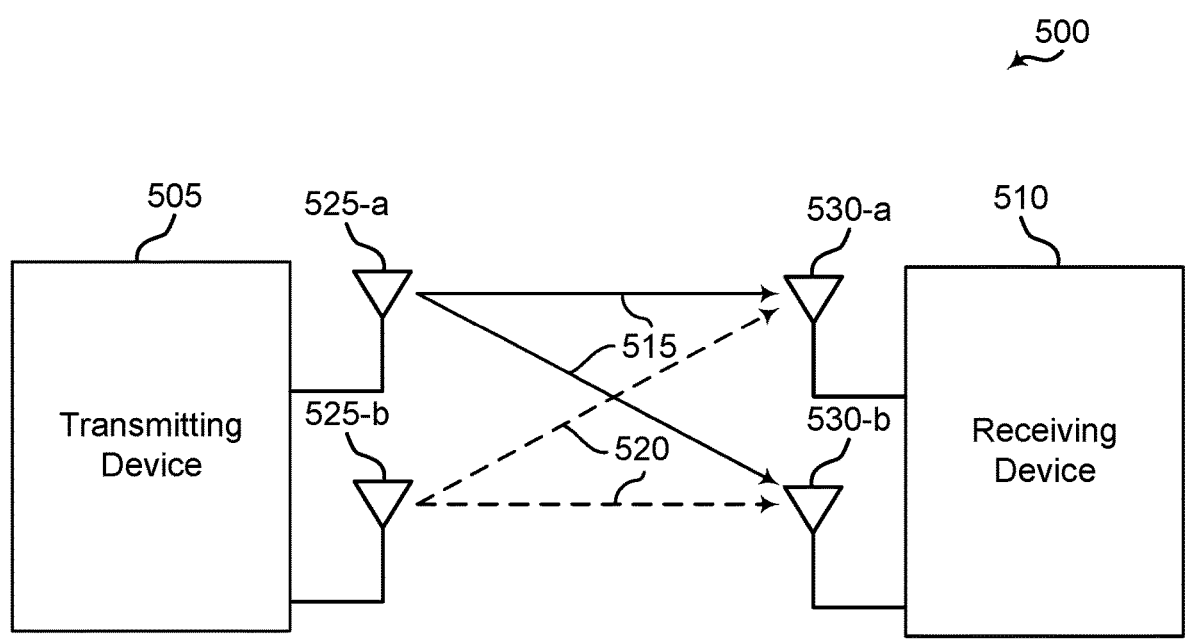
FIG. 5 shows an example of a wireless communication system that uses spatial streams for wireless communication according to some implementations.

FIG. 5 shows an example of a wireless communication system 500 that uses spatial streams for wireless communication according to some implementations. The wireless communication system 500 may include a transmitting device 505 and a receiving device 510. The transmitting device 505 may be configured to communicate with the receiving device 510 using a plurality of spatial streams 515, 520. The transmitting device 505 may be an example of an AP or STA. The receiving device 510 may be an example of an AP or STA.

Spatial streams 515, 520 may be used in some MIMO wireless communications, such as MIMO communications that use spatial multiplexing. In spatial multiplexing, the transmitting device 505 may transmit independent and separately encoded data signals, known as spatial streams, to the receiving device 510.

To perform spatial multiplexing, the transmitting device 505 may include a set of transmit antennas 525-a and 525-b to transmit signals. One or more transmit antennas (for example, antenna 525-a or antenna 525-b) may be configured to transmit each spatial stream. The transmitting device 505 may be configured to transmit a number of a spatial streams that is equal to the number of transmit antennas of the transmitting device 505. The transmitting device 505 may include any number of transmit antennas, for example, the transmitting device 505 may include three, four, five, six, seven, eight, nine, ten, eleven, twelve, thirteen, fourteen, fifteen, sixteen, or more antennas. In some implementations, the transmitting device 505 may be configured to transmit a number of a spatial streams that is different than the number of transmit antennas of the transmitting device 505.

To perform spatial multiplexing, the receiving device 510 may include a set of receive antennas 530-a and 530-b to receive signals. The receive antennas 530-a and 530-b may be configured to receive every spatial stream 515, 520 transmitted by the transmitting device 505. The receiving device 510, however, may be configured to successfully decode a number of spatial streams that is equal to the number of receive antennas of the receiving device 510. As such, the number of spatial streams that may be communicated between the transmitting device 505 and the receiving device 510 may be equal to the minimum of the number of transmit antennas 525 or the number of receive antennas 530. The receiving device 510 may include any number of receive antennas, for example, the receiving device 510 may include three, four, five, six, seven, eight, nine, ten, eleven, twelve, thirteen, fourteen, fifteen, sixteen, or more antennas.

The wireless communication system 500 shows a 2×2 system where the transmitting device 505 has two transmit antennas 525-a and 525-b and the receiving device 510 has two receive antennas 530-a and 530-b. In other examples, the wireless communication system 500 may include other examples of M×N systems (for example, 3×3, 4×4, 2×3, 3×2, etc.). In some implementations, the APs may have many more antennas (whether transmit or receive) than the number of antennas (whether transmit or receive) STAs have. In some implementations, STAs may have up to three or four antennas (whether transmit or receive).

In some EHT environments, a number of spatial streams that may be allocated to STAs in a single PDU may be up to sixteen spatial streams. In contrast, a maximum number of spatial streams that are allocatable in other environments, such as HE environments, may be up to eight spatial streams. To accommodate allocating additional spatial streams, techniques for control signaling are described herein.

Figure 6:
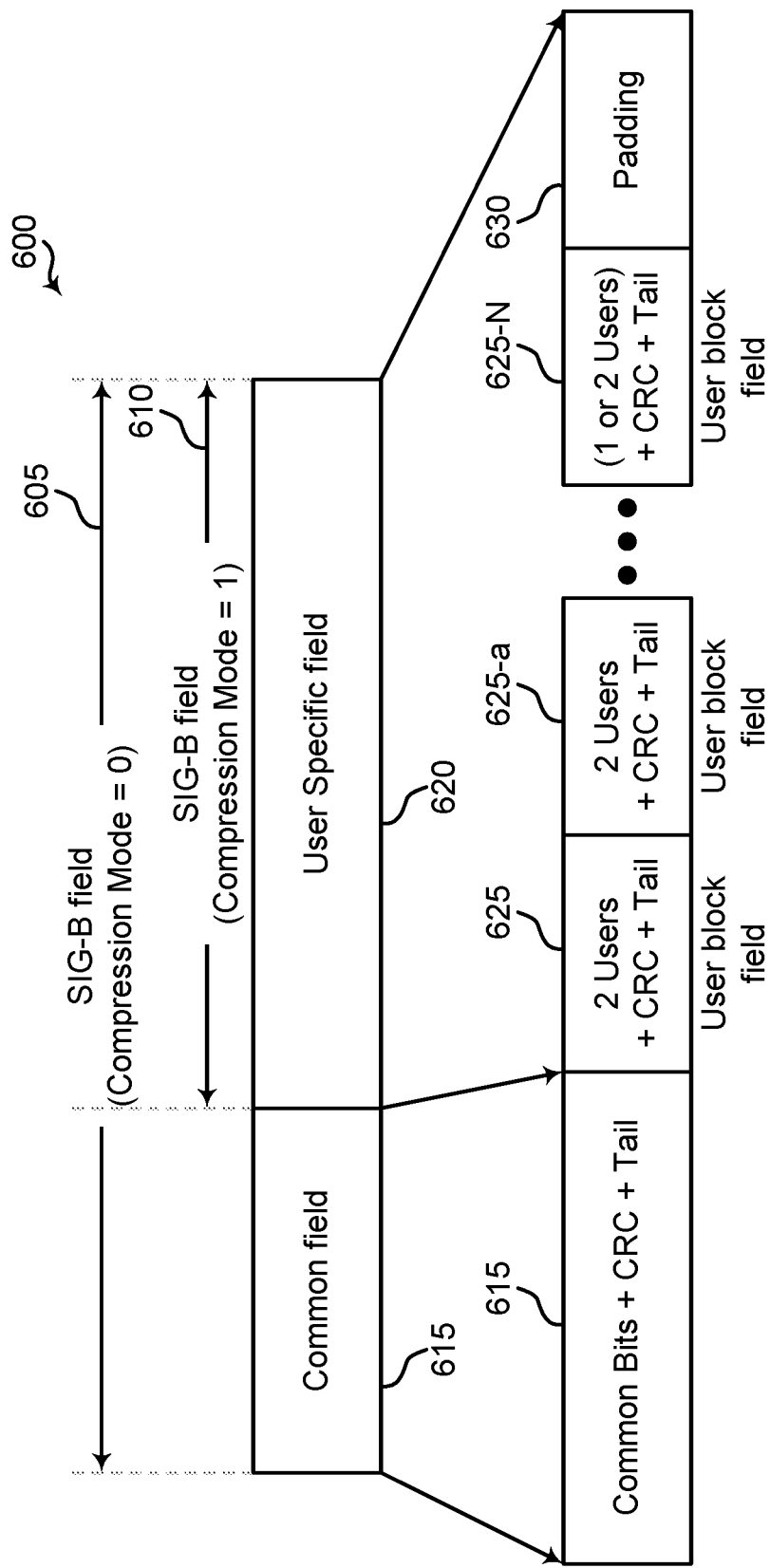
FIG. 6 shows an example of a SIG-B field usable for wireless communications between an AP and a plurality of STAs according to some implementations.

FIG. 6 shows an example of a SIG-B field 600 usable for wireless communications between an AP and a plurality of STAs according to some implementations. The SIG-B field 600 may be an example of the HE-SIG-B field 234 described with reference to FIG. 2B. In some cases, the SIG-B field 600 may be an example of an EHT-SIG-B field. In some cases, the EHT-SIG-B field may be a modified version of a HE-SIG-B field. The SIG-B field 600 may be part of a multiple user physical layer convergence procedure (PLCP) protocol data unit (MU PPDU). The MU PPDU may be an example of a HE MU PPDU or an EHT MU PPDU.

The type of SIG-B field 600 used may be based on a compression mode of different possible compression modes of the SIG-B field. The compression mode may be indicated in a SIG-A field. For example, there may be two compression modes. In a first compression mode (for example, compression mode=0), a SIG-B field 605 may be or include a common field 615 and a user specific field 620. In a second compression mode (for example, compression mode=1), a SIG-B field 610 may be or include the user specific field 620 and may not include the common field 615.

The common field 615 may be configured to indicate an RU allocation for a data portion of the MU PPDU in the frequency domain, RUs allocated for MU-MIMO, or the number of users in MU-MIMO allocations. In some cases, the common field 615 may include an RU allocation table, cyclic redundancy check (CRC) information, a tail, or other information. The RU allocation table may be an example of a bit map that maps an index value (for example, an eight bit value) to a plurality of different RU allocations.

The user specific field 620 may include a plurality of user block fields 635 and padding 640 in some implementations. A user block field 635 may indicate a variety of information for one or two STAs. For example, the user block field 635 may include at least one STA ID, a spatial configuration for at least one STA, CRC information, a tail, or other information.

In some examples, aspects of the user specific field 620 in the SIG-B field 610 may be configured to indicate up to sixteen different spatial streams where each individual STA may be allocated up to four spatial streams. In some examples, aspects of the user specific field 620 in the SIG-B field 605 may be configured to indicate a spatial configuration using up to four bits. In some examples, aspects of the common field 615 in the SIG-B field 605 may include an RU allocation table configured to allocate resources for a bandwidth up to 320 MHz.

Figure 7:
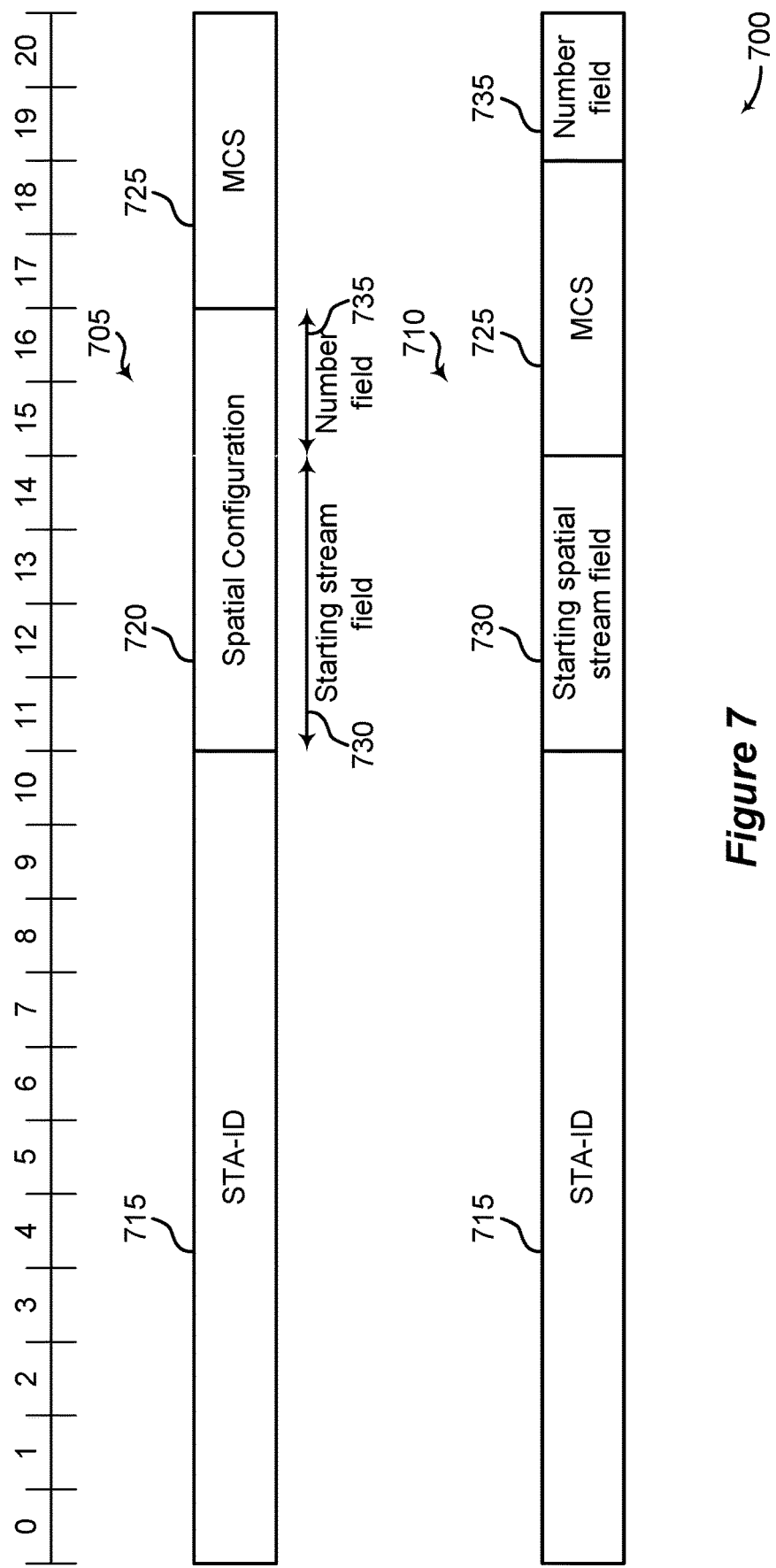
FIG. 7 shows examples of fields usable for wireless communications between an AP and one or more STAs according to some implementations.

FIG. 7 shows examples of fields 700 usable for wireless communications between an AP and one or more STAs according to some implementations. An MU PPDU may include multiple fields 700, each of which is associated with a particular STA. In some implementations, the fields 700 may be used to allocate MU MIMO resources to a STA. In some implementations, a field 700 may be at least a portion of a user specific field 620 (for example, at least a portion of a user block field 625) in a SIG-B field 605 as described with reference to FIG. 6. In some examples, the fields 700 may be used when the compression mode for the SIG-B field is equal to one.

In some EHT environments, the number of different possible spatial configurations may be greater than other environments (for example, HE environment) because an AP may be configured to allocate up to sixteen different spatial streams to a plurality of STAs. The fields 700 field may be configured to indicate to an individual STA its spatial stream configuration, may be configured in a variety of different ways. Two examples of configurations are shown, including a field 705 and a field 710. Other examples of configurations are also included in or contemplated by this disclosure. Fields with the same or similar numbers and names in different fields 705 or 710 may be implemented identically or similarly.

The field 705 may include a STA ID field 715, a spatial configuration field 720, and an MCS field 725. The field 710 may include a STA ID field 715, a starting spatial stream field 730, an MCS field 725, and a spatial stream number field 735. The fields 705 or 710 may include twenty-one bits, in some implementations.

The STA ID field 715 may indicate the STA intended to use the field 705 or 710. In some implementations, the STA ID field 715 may include eleven bits (for example, B0-B10).

The spatial configuration field 720 may indicate the spatial streams that are allocated to the STA indicated in the STA ID field 715. The spatial configuration field 720 may be divided into a starting spatial stream field 730 and a spatial stream number field 735. The starting spatial stream field 730 may indicate the index of a first spatial stream being allocated to the STA. The spatial stream number field 735 may indicate the number of spatial streams being allocated to the STA. Using this information, the STA may be configured to determine the indices for each of any other spatial streams allocated to the STA by the AP.

In some EHT environments, the AP may be able to allocate up to sixteen different spatial streams to different STAs, where any individual STA may be allocated up to four spatial streams. In such examples, the starting spatial stream field 730 may indicate one of the sixteen different spatial streams as the starting spatial stream that is allocated to the STA. In order to identify one of the sixteen different options, the starting spatial stream field 730 may include up to four bits. The spatial stream number field 735 may be configured to identify the number of spatial streams allocated to the STA. The STA may use the starting spatial stream and the number of spatial streams to identify the set of spatial streams allocated to the STA. Because the maximum number of spatial streams allocatable to the STA may be four, the spatial stream number field 735 may include up to two bits.

The MCS field 725 may indicate the modulation and coding scheme for resources allocated to the STA indicated in the STA ID field 715. The MCS field 725 may include four bits (for example, B17-B20).

Although the fields 705 and 710 show particular distributions of fields, the fields may be distributed throughout the fields 705 or 710 in any manner, including in a manner different than that shown. For example, the MCS field 725 may be before the spatial configuration field 720. In other examples, bits of fields may be interleaved with one another. Other configurations are also possible.

In some implementations, the spatial configuration field 720 may include six bits (for example, B11-B16). The six bits may be found in sequential positions, such as is shown in the field 705. In other examples, however, the spatial configuration field 720 may not occupy consecutive bits in the field, for example, the six bits may include a first subset in a first set of bits and a second subset of bits in a second set of bits that are separated from the first set of bits. For example, in field 710, four bits of the spatial configuration field are at positions B11-B14 and two bits of the spatial configuration field are at positions B19-B20. The field 710 shows the starting spatial stream field 730 at positions B11-B14 and the spatial stream number field 735 at positions B19-B20. In other examples, information may be distributed between the six bits of the spatial configuration field in any manner. For example, the number field 735 may be positioned somewhere in B11-B14 and the starting spatial stream field 730 may be distributed somewhere in B11-B14 and B19-B20 (for example, the number field 735 may be positioned before or after the starting spatial stream field 730).

The STA may be configured to identify a default coding scheme based on receiving one of the fields 705 or 710. For instance, to make the spatial configuration field 720 six bits, a reserved bit and a coding bit found in fields in other environments (for example, HE) may be repurposed for the spatial stream configuration. In such implementations, the fields 700 may no longer indicate information about the coding scheme. In some implementations, the STA may identify the default scheme as a low-density parity-check (LDPC) code. In some implementations, the STA may identify the default scheme as a block check character (BCC) scheme. In some implementations, the STA may determine whether the field 705 or the field 710 is being received based on the SIG-A field indicating that the message is an EHT message or an HE message. For example, a wide bandwidth field of the SIG-A field may indicate that the bandwidth of the resources being allocated by the message is a first bandwidth (for example, 320 MHz) that exceeds a threshold frequency (for example, 160 MHz). In such examples, a STA may indicate the type of message being received based on that wide bandwidth field of the SIG-A field.

Figure 8:
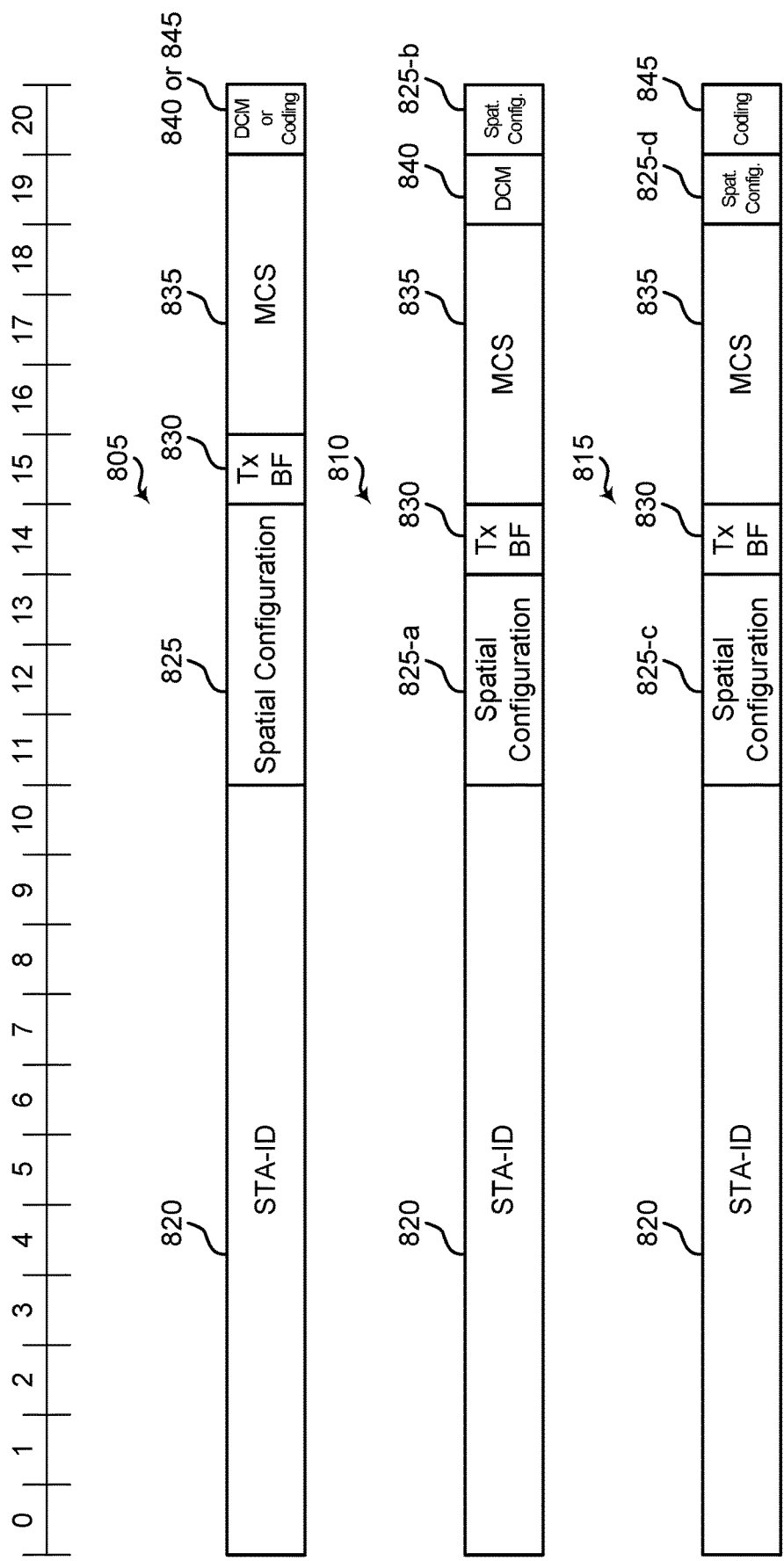
FIG. 8 shows examples of fields usable for wireless communications between an AP and one or more STAs according to some implementations.

FIG. 8 shows examples of fields 800 usable for wireless communications between an AP and one or more STAs according to some implementations. An MU PPDU may include multiple fields 800, each of which is associated with a particular STA. In some implementations, the fields 800 may be used to allocate resources to a STA either in an MU MIMO environment or in a non-MU MIMO environment. A field 800 may be at least a portion of a user specific field 620 (for example, at least a portion of a user block field 625) in a SIG-B field 605 as described with reference to FIG. 6. In some examples, the fields 800 may be used when the compression mode for the SIG-B field is equal to a first value (for example, zero).

In some EHT environments, the number of different possible spatial configurations may be greater than other environments (for example, HE environment) because an AP may be configured to allocate up to sixteen different spatial streams to a set of STAs. The SIG-B field may be configured to indicate to an individual STA its spatial configuration. In some implementations, the fields may be configured to indicate non-MU-MIMO resource allocations for STAs (for example, OFDMA RU allocations). The fields 800 may be configured in a variety of different ways. Three examples of configurations are shown, including a field 805, a field 810, and a field 815. Other examples of configurations are also included in and contemplated by this disclosure. Fields with the same or similar numbers and names in different fields 805, 810, or 815 may be implemented identically or similarly in some implementations.

The fields 805, 810, or 815 may include a STA ID field 820, a spatial configuration field 825, a transmit beamforming field 830, an MCS field 835, a dual code modulation (DCM) field 840, or a coding field 845 or various combinations thereof. The fields 805, 810, or 815 may include twenty-one bits, in some implementations.

The STA ID field 820 may indicate the STA intended to use the field 805, 810, or 815. In some implementations, the STA ID field 820 may include eleven bits (for example, B0-B10).

The spatial configuration field 825 may indicate the spatial streams that are allocated to the STA indicated in the STA ID field 820. In some EHT environments, the AP may be able to allocate up to sixteen different spatial streams to different STAs, where any individual STA may be allocated up to four spatial streams. Using up to sixteen spatial streams may be different than other systems, which may allow up to eight different spatial streams. In such examples, the spatial configuration field 825 may have four bits. Four bits allows the fields 805, 810, or 815 to indicate an additional index value or other identifying information. In some implementations, the spatial configuration field 825 may indicate an index value, which may be used with a bit map or other mapping to identify the spatial configuration of the STA.

To make the spatial configuration field 825 four bits, the fields 805, 810, or 815 may repurpose bits of the DCM field 840 or the coding field 845 found in fields in other environments (for example, HE environments). For example, the field 805 shows the spatial configuration field 825 being a contiguous set of bits (for example, B11-B14) with the last bit (for example, B20) being either the DCM field 840 or the coding field 845. In some other such examples, the positions of the fields in the field 805 may be rearranged in any manner.

In another example, the field 810 shows the spatial configuration field 825 having a non-contiguous set of bits. A first set of bits (for example, 825-a) is positioned at B11-B13 and a second set of one or more bits (for example, 825-b) is positioned at B20. The second set of one or more bits may be a repurposing of the coding field 845 found in some environments. In some other such examples, the positions of the fields in the field 810 may be rearranged in any manner.

In another example, the field 815 shows the spatial configuration field 825 having a non-contiguous set of bits. A first set of bits (for example, 825-c) is positioned at B11-B13 and a second set of one or more bits (for example, 825-d) is positioned at B19. The second set of one or more bits may be a repurposing of the DCM field 840 found in some environments. In some other such examples, the positions of the fields in the field 815 may be rearranged in any manner.

The transmit beamforming field 830 may indicate whether beamforming is used when transmitting one or more spatial streams. The transmit beamforming field 830 may include a single bit (for example, B14 or B15). In some implementations, a first value of the transmit beamforming field 830 may indicate that a beamforming steering matrix is applied to the waveform of a transmission (for example, a SU transmission), and a second value may indicate that a beamforming steering matrix is not applied.

The MCS field 835 may indicate the modulation and coding scheme for resources allocated to the STA indicated in the STA ID field 820. The MCS field 835 may include four bits (for example, B15-B18 or B16-B19).

The DCM field 840 may indicate whether a dual code modulation scheme is used. The DCM field 840 may include a single bit (for example, B19 or B20). In some implementations, a first value of the DCM field 840 may indicate that the dual code modulation scheme is applied to the transmission, and a second value may indicate that the dual code modulation scheme is not applied.

The coding field 845 may indicate whether a BCC or a LDPC is used for error correction coding for the transmission. The coding field 845 may include a single bit (for example, B20). In some implementations, a first value of the coding field 845 may indicate that a LDPC code is applied to the transmission, and a second value may indicate that a BCC code is applied to the transmission.

Although the fields 805, 810, and 815 show particular distributions of fields, in other implementations, the fields may be distributed throughout the fields 805, 810, or 815 in any suitable manner. In some examples, bits of fields may be interleaved with one another. Other configurations are also possible.

In some implementations, either the DCM field 840 or the coding field 845 may be absent from the fields 805, 810, or 815. In some implementations, the STA may determine whether a possible field is absent from the fields 800. If a field is absent from the fields 805, 810, or 815, the STA may determine a default setting for the absent field. For example, the STA may determine default settings for the coding and the DCM fields absent from the fields 810 and 815, respectively. In some implementations, fields in the same SIG-B field may include different combinations of fields. For the DCM field, in some implementations, the STA may identify the default setting as dual code modulation not being applied. In other implementations, the STA may identify the default setting as dual code modulation being applied. For the coding field, in some implementations, the STA may identify the default scheme as a LDPC code. In other implementations, the STA may identify the default scheme as a BCC scheme.

Figure 9:
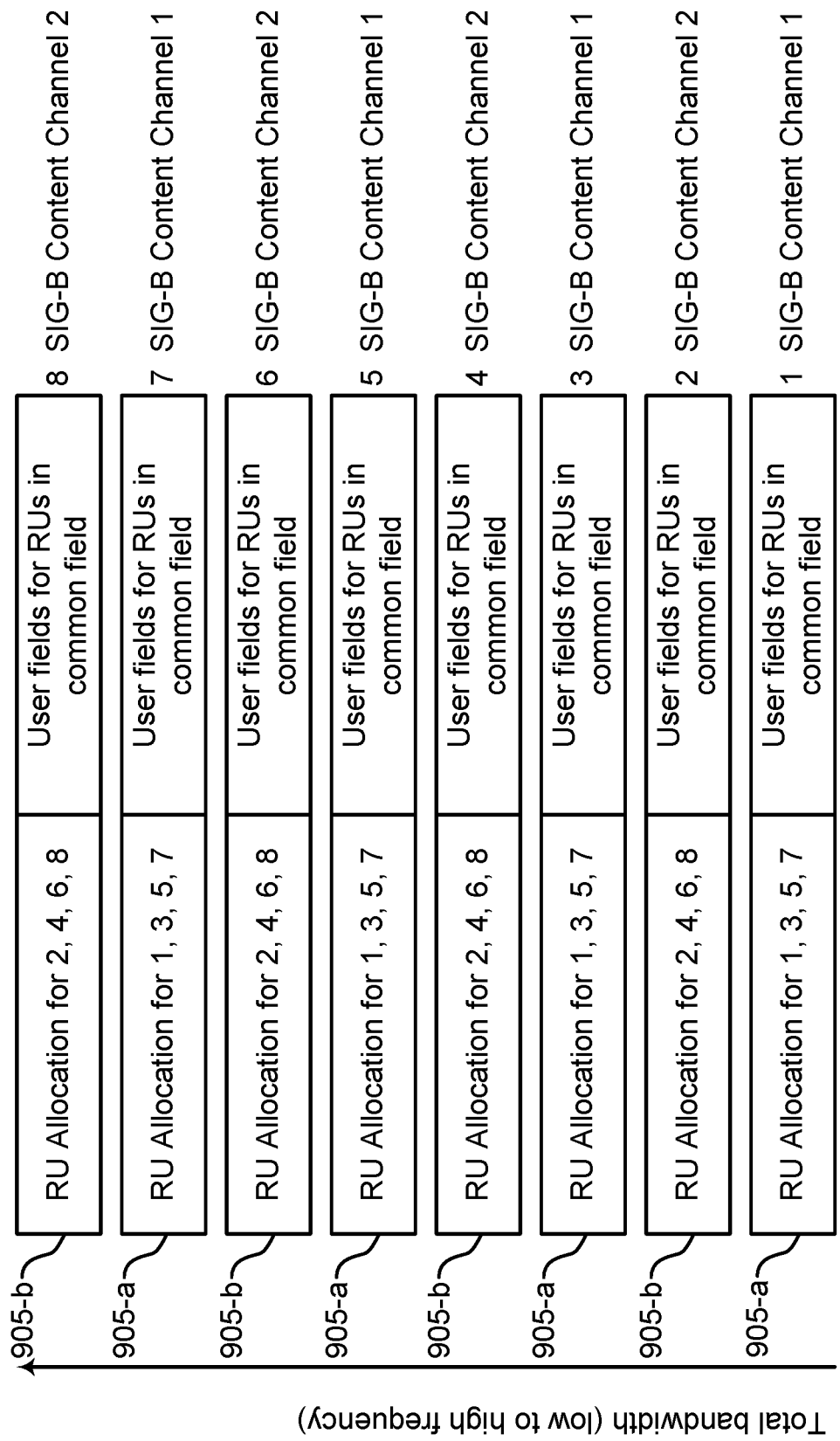
FIG. 9 shows an example of a SIG-B field usable for wireless communications between an AP and one or more of STAs according to some implementations.

FIG. 9 shows an example of a SIG-B field 900 usable for communications between an AP and one or more STAs according to some implementations. The SIG-B field 900 may include a compression mode of zero and bandwidth of up to 320 MHz for an OFDMA signal.

The SIG-B field 900 may include a plurality of content channels 905, where each content channel may cover a frequency segment of the total bandwidth. Each content channel 905 is associated with a common field 910 that includes the RU allocations for a particular group of users, and user specific fields 915 for the particular users. The SIG-B field 900 may also include a [1 2 1 2] structure, for example, where the "1's" correspond to content channels 905-a and the "2's" correspond to content channels 905-b. In some wireless communication systems, the total bandwidth may be up to 160 MHz and the frequency segment for each content channel 905 may be 20 MHz.

Increasing the bandwidth to be greater than 160 MHz (for example, between 160 MHz and 320 MHz) may increase the amount of control signaling needed for the RU allocation table. The RU configurations may be determined using an eight-bit index and a bit map. As the bandwidth increases, the number of content channels 905 may also increase to allocate additional RUs. For example, if the total bandwidth goes from 160 MHz to 320 MHz, the number of content channels or the amount of control signaling may go up by twice as much.

To reduce the amount of control signaling for higher total bandwidths, the STA may interpret the content channels 905 to span a greater frequency segment. For example, the STA may interpret each of content channels 905 to span 40 MHz. In some implementations, the frequency segment spanned by each of the content channels may be based on the total bandwidth. In some implementations, the frequency segment may be determined based on a tiered system. For example, if the total bandwidth is less than or equal to a first bandwidth (for example, greater than 160 MHz), a first frequency segment (for example, 20 MHz) may be used; and if the total bandwidth is greater than the first bandwidth (for example, 160 MHz) a second frequency segment (for example, 40 MHz) may be used. Any number of thresholds and frequency segments may be used.

In some implementations, the STA may dynamically determine the frequency segment for each content channel 905. A benefit of having content channels 905 span a frequency segment of 40 MHz when the total bandwidth is 320 MHz is that the RU allocation table size is not changed as compared to total bandwidths of 160 MHz. In this manner, the signaling overhead for a 160 MHz EHT MU PPDU and a 320 MHz EHT MU PPDU may be the same.

In some implementations, MU-MIMO may not be applied to RUs that are less than a threshold number of tones. For example, the threshold may be 242 tones. By applying MU-MIMO to RUs that exceed the tone threshold, the RU allocation table may remain eight bits per frequency segment (for example, 40 MHz). In some examples, if the threshold is less than 242, the resource allocation table may not remain eight bits (e.g., less than 8 bits) per frequency segment and the RU configuration may change.

Figure 10:
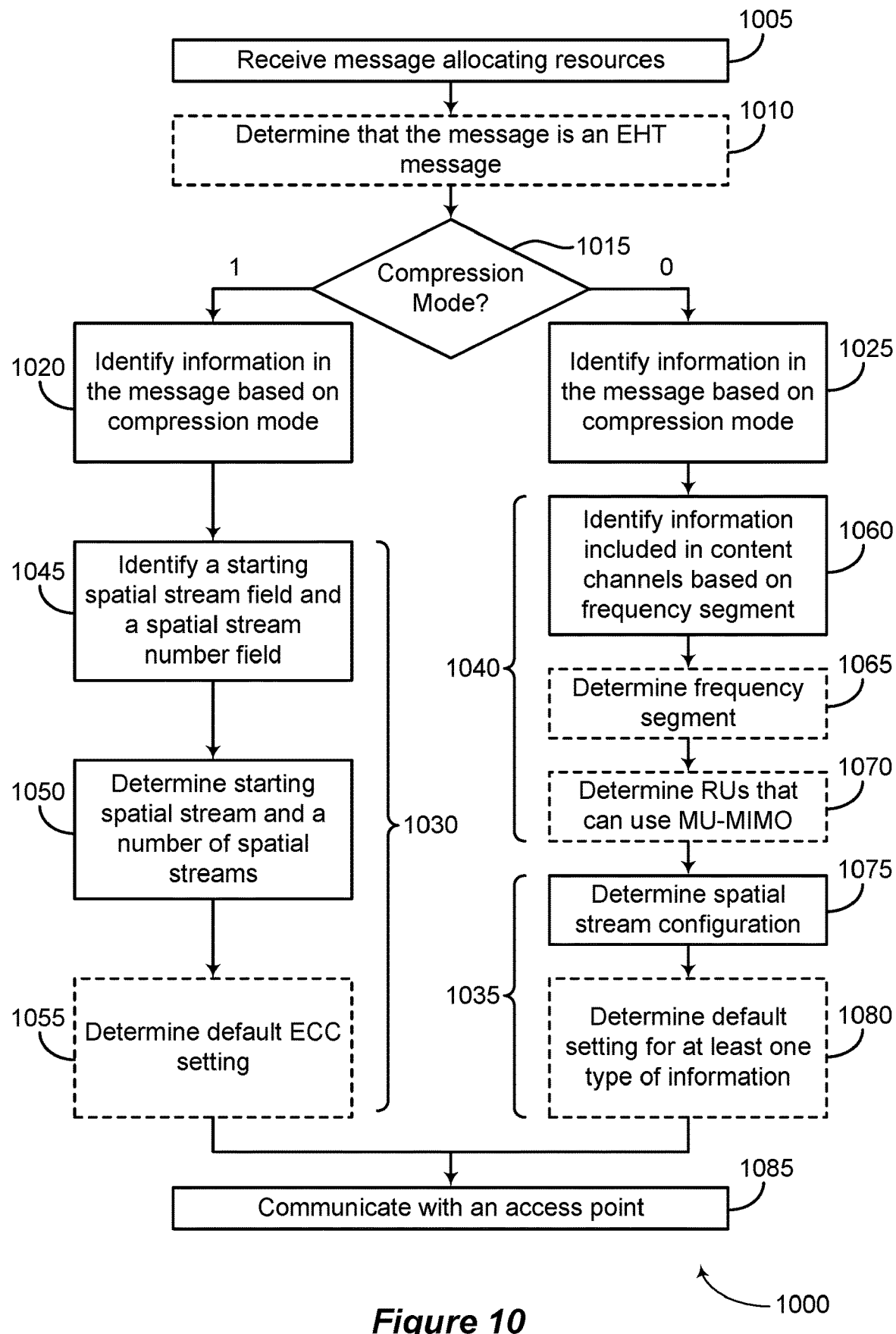
FIG. 10 shows an example of a flowchart for communicating using control signaling in a wireless communication system according to some implementations.

FIG. 10 shows an example of a flowchart 1000 for communicating using control signaling in a wireless communication system according to some implementations. The flowchart 1000 may show functions of a STA upon receiving a message from an AP that allocates resources to the STA for either an uplink or a downlink transmission.

At block 1005, the STA may receive a message allocating resources to the STA. The message may be received from an AP. The message may be an example of an HE MU PPDU or an EHT MU PPDU.

The STA may be configured to determine whether the message is for an HE environment or an EHT environment. For example, at block 1010, the STA may optionally determine that the message is an EHT message. The STA may be configured to interpret or decode the message differently based on whether the message is an HE message or an EHT message. The STA may determine whether the message is an EHT message based on information included in a SIG-A field. For example, the STA may determine that the number of allocatable spatial streams is greater than eight spatial streams (for example, sixteen spatial streams) based on the contents of a SIG-A field. In another example, the STA may determine that the number of allocated spatial streams exceeds eight based on the contents of a SIG-A field. In another example, the STA may determine that the total bandwidth allocated to the STA is greater than 160 MHz (for example, 320 MHz) based on the contents of a SIG-A field.

In some implementations, a wide bandwidth field of the SIG-A field (for example, an EHT-SIG-A field) may indicate whether the bandwidth of the resources being allocated is a first bandwidth (for example, 320 MHz) that exceeds a threshold bandwidth (for example, 160 MHz). The STA may be configured to determine whether the message is an EHT message or an HE message based on the contents of the wide bandwidth field. For example, the wide bandwidth field may be a single bit set to a first value (for example, 1) indicating that the bandwidth exceeds the threshold bandwidth (for example, 160 MHz) or a second value (for example, 0) indicating that the bandwidth does not exceed the threshold bandwidth.

In some implementations, the SIG-A field may include a bandwidth field (in addition to the wide bandwidth field) that indicates a bandwidth of the resource being allocated when the bandwidth does not exceed the threshold bandwidth. The bandwidth field may be an example of a bandwidth field of a HE-SIG-A field. The bandwidth field may indicate whether the bandwidth is 20 MHz, 40 MHz, or 80 MHz. The bandwidth field may include up to three bits.

In some implementations, the wide bandwidth field may indicate a bandwidth of the signal. For example, if the wide bandwidth field includes a first value indicating that the bandwidth exceeds the threshold frequency, the wide bandwidth field may indicate that the bandwidth is a fixed amount, such as 320 MHz. If such is the case, the bandwidth field of the SIG-A field may be repurposed to indicate a puncture mode of the resources being allocated. The bandwidth field may indicate whether the resources are not punctured, are punctured according to a first puncturing mode, or are punctured according to a second puncturing mode. In some implementations, two bits of the bandwidth field may be used to indicate the puncturing modes. The STA may be configured to interpret the bandwidth field as either including an indication of bandwidth or an indication of a puncture mode based on the information in the wide bandwidth field.

At block 1015, the STA may determine the compression mode of the SIG-B field in the message. The STA may determine the compression mode of the SIG-B field based on an indicator in the SIG-A field of the message. In some implementations, the STA may determine whether the SIG-B field includes a common field based on the compression mode.

At blocks 1020 and 1025, the STA may identify information in the message based on the compression mode. For example, the STA may identify what fields are expected to be in what location based on the compression mode. The STA may interpret the message based on the expected field locations. In some implementations, the STA may identify information in the message based on the compression mode and the type of the message (for example, EHT or HE). In such implementations, the STA may identify what fields are expected to be in what location based on the compression mode and type of the message. The STA may interpret the message based on the expected field locations.

The STA may perform at least one of the options or operations 1030, 1035, 1040 based on receiving the message. For example, if the compression mode of the SIG-B field is one, the STA may proceed with operation 1030 over which the STA identifies MU-MIMO resource allocations in a user specific field as described with reference to FIG. 7. If the compression mode of the SIG-B field is zero, the STA may proceed with operation 1035 over which the STA identifies non-MU-MIMO resource allocation in a user specific field as described with reference to FIG. 8. As another example of the implementation in which the compression mode of the SIG-B field is zero, the STA may additionally or alternatively proceed with operation 1040 over which the STA interprets RU allocations in an RU allocation table as described with reference to FIG. 9. In some implementations, the procedures of operations 1035 and 1040 may be performed in any combination or in any order.

In some implementations, operation 1030 may include the performance of sub-operations or blocks 1045, 1050 and 1055. At block 1045, the STA may identify a starting spatial stream field and a spatial stream number field. The STA may identify a location of these fields in the message. The STA may identify these fields based on the compression mode and the message being an EHT message.

At block 1050, the STA may determine a starting spatial stream and a number of spatial streams. The starting spatial stream and the number of spatial streams may be for resources allocated to the STA by the AP. In some implementations, the starting spatial stream may be identified by a spatial stream index. In some implementations, the index may be four bits long. The number of spatial streams may be identified by two or three bits.

At block 1055, the STA may optionally determine a default error correction code (ECC) setting. In some implementations, the default setting may be for using LDPC code on the resources allocated to the STA.

In some implementations, operation 1040 may include the performance of sub-operations or blocks 1060, 1065 and 1070. At block 1060, the STA may identify information included in content channels based on a frequency segment. For example, the STA may interpret content channels to cover a frequency segment of 40 MHz rather than 20 MHz. In some implementations, the frequency segment may be any value greater than 20 MHz or any value between 20 MHz and 40 MHz.

At block 1065, the STA may optionally determine the frequency segment for the content channels. The STA may determine the type of message or the total bandwidth of the resources allocated to the STA and determine the frequency segment based on one or both of that information. For example, the STA may determine that a STA may be allocated with a SIG-B field that may have a total bandwidth of 320 MHz and may include eight content channels. In such implementations, the content channels may each span a frequency segment of 40 MHz.

At block 1070, the STA may optionally determine RUs that may use MU-MIMO. The STA may identify which RUs satisfy a tone threshold. In some cases, the tone threshold is 242 tones. In such cases, RUs that include more than 242 tones may be allocated using MU-MIMO techniques.

In some cases, operation 1035 may include the performance of sub-operations or blocks 1075 and 1080. At block 1075, the STA may determine a spatial stream configuration. In some cases, this may be for non-MU-MIMO resource allocations when the compression mode of the SIG-B field is a zero. The spatial stream configuration may be indicated using a four bit field for EHT environments. To achieve four bits, the DCM bit or the coding bit may be repurposed for the spatial stream configuration as, for example, shown in FIG. 8.

At block 1080, the STA may optionally determine a default setting for at least one type of information. In some cases, the STA may determine a default setting for the information whose field was repurposed for the spatial configuration. In some cases, the default setting may be determined for DCM or for error correction coding.

At block 1085, the STA may communicate with an AP using the resource allocations included in the message. To communicate with the AP, the STA may perform any combination of the operations or functions described herein.

Although some blocks are identified as potentially optional, even those that are identified as such may be implemented. Likewise, although some blocks are not plainly identified as optional, even those that are not identified as optional may be implemented as optional in some implementations.

Figure 11A:
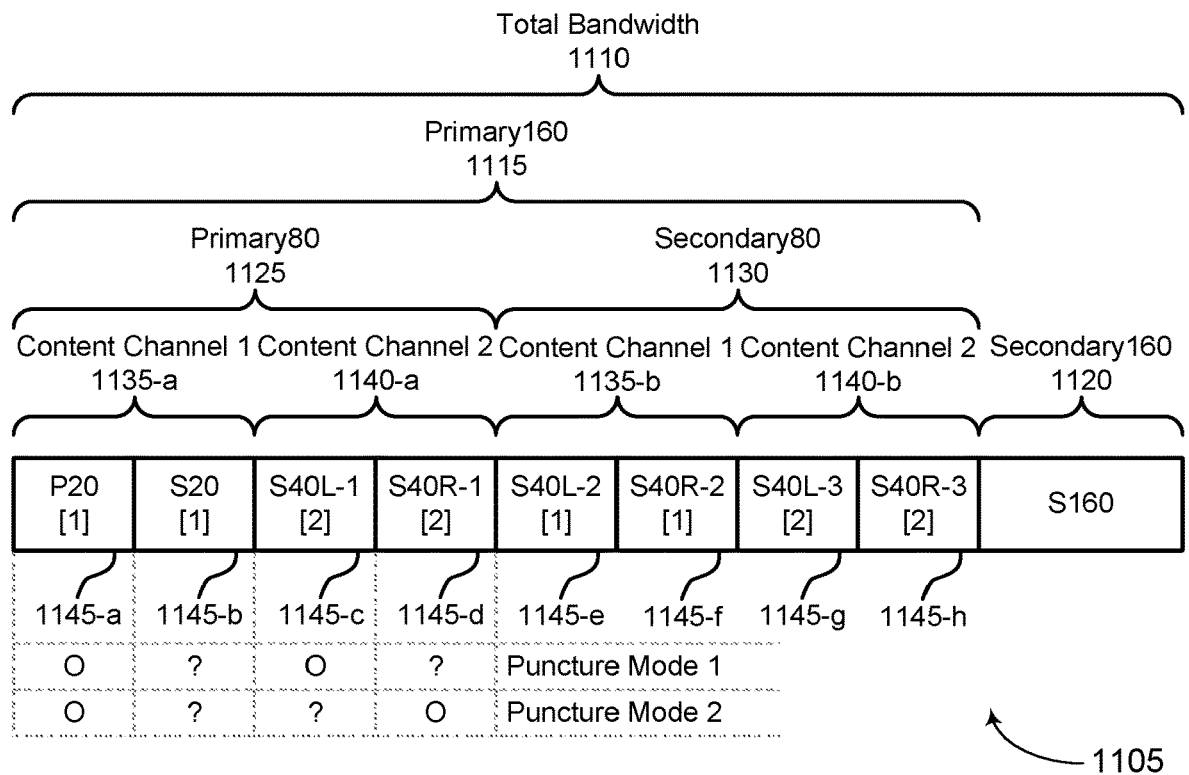
FIG. 11A shows an example of a SIG-B field usable for wireless communications between an AP and one or more STAs according to some implementations.

FIG. 11A shows an example of a SIG-B field 1105 usable for wireless communications between an AP and one or more STAs according to some implementations. The SIG-B field 1105 may be included in a message (for example, an MU PPDU) that has a total bandwidth 1110 that exceeds 160 MHz. For example, the total bandwidth 1110 of the message that includes the SIG-B field 1105 may be 320 MHz. In such examples, the RU allocation tables may be included in particular subbands 1145 of the SIG-B field 1105. In some implementations, some fields of an HE message such as a STA ID field, spatial configuration field, transmit beamforming field, MCS field, DCM field, coding field, or a combination thereof may be repurposed to indicate that the bandwidth exceeds 160 MHz (for example, is 320 MHz). In some implementations, the STA may determine that the SIG-B field 1105 is part of an EHT message, and the STA may determine a default setting for spatial reuse of the resources allocated by the message based on determining that the SIG-B field 1105 is part of an EHT message.

The SIG-B field 1105 may be divided into a primary 160 MHz ("primary160") 1115 and a secondary 160 MHz ("secondary160") 1120. The primary160 1115 may be divided into a primary 80 MHz ("primary80") 1125 and a secondary 80 MHz ("secondary80") 1130, which may be further divided into a plurality of first content channels 1135 (for example, first content channels 1135-*a*, 1135-*b*) and a plurality of second content channels 1140 (for example, second content channels 1140-*a*, 1140-*b*). As such, the SIG-B field 1105 may comprise a bandwidth that includes a plurality of content channels.

A first content channel 1135-*a* may span a first frequency segment. In some cases, the first frequency segment may be 40 MHz when the total bandwidth 1110 is 320 MHz. The other content channels (whether first content channels 1135-*a*, 1135-*b* or second content channels 1140-*a*, 1140-*b*) may also span frequency segments that may be 40 MHz. The frequency spectrum band occupied by each content channel may be different, but a length or size of the frequency segments may be the same. In some implementations, the SIG-B field 1105 may have a total bandwidth of 320 MHz and may include four first content channels 1135 and four second content channels 1140. In such implementations, the content channels 1135 and 1140 each span 40 MHz.

The content channels 1135 and 1140 may include one or more subbands 1145 (for example, subbands 1145-*a*, 1145-*b*, 1145-*c*, 1145-*d*, 1145-*e*, 1145-*f*, 1145-*g*, 1145-*h*). The subbands 1145 may span a frequency segment that is less than the frequency segment spanned by the content channels 1135 and 1140. In some implementations, the subbands may span a frequency segment that is 20 MHz in size or length. In such implementations, each content channel 1135 and 1140 may include two subbands 1145. For example, the first content channel 1135-*a* may include a first subband 1145-*a* (labeled P20) and a second subband 1145-*b* (labeled S20).

When receiving an MU PPDU, a STA may initially listen or decode only a portion of the bandwidth occupied by an MU PPDU in an effort to conserve power. Activating receive chains to listen for a larger bandwidth signal increases power consumption. To conserve power, the STA may initially listen to one or more portions of the MU PPDU. If a signal is detected over the initial portions, the STA may then activate more receive chains to listen over the entire bandwidth occupied by the MU PPDU.

To accommodate such power saving, the RU allocation tables for the first content channels 1135 may be included in a single subband, for example in subband 1145-*a*, and the RU allocation tables for the second content channels 1140 may be included in a single subband, for example in subband 1145-*c*. For example, the subband 1145-*a* may include four RU allocation tables, one for each of the first content channels 1135 in the SIG-B field 1105 (for example, first content channel 1135-*a*, first content channel 1135-*b*, and two first content channels included in the secondary160 1120). Similarly, the subband 1145-*c* may include four RU allocation tables, one for each of the second content channels 1140 in the SIG-B field 1105 (for example, second content channel 1140-*a*, second content channel 1140-*b*, and two second content channels included in the secondary160 1120). With such a structure, the STA may be configured to determine the RU allocations for the entire SIG-B field 1105 by decoding a portion of the SIG-B field 1105 (for example, the primary80 1125). This may enable the STA to conserve power.

The subbands 1145 of the SIG-B field 1105 may be organized into a repeating structure where subbands include specific RU allocation tables to facilitate the STA in conserving power. The SIG-B field 1105 may be an example of a [1 1 2 2] structure of subbands. In such a structure, a first subband 1145-*a* and a second subband 1145-*b* in the first content channel 1135-*a* may each include RU allocation tables for the first content channels 1135, and a third subband 1145-*c* and a fourth subband 1145-*d* of the second content channel 1140-*a* may each include RU allocation tables for the second content channels 1140. This pattern may be in the primary80 1125. In some implementations, this pattern may be repeated throughout the entire SIG-B field 1105. The STA may be configured to decode either one of the first subband 1145-*a* or the second subband 1145-*b* to determine the RU allocation tables for the first content channel 1135. The STA may be configured to decode either one of the third subband 1145-*c* or the fourth subband 1145-*d* to determine the RU allocation tables for the second content channels 1140.

In some implementations, the message, including the SIG-B field 1105, may cover a bandwidth that is large enough that the frequency resources are punctured, or are not contiguous. Consequently, some of the structures of the SIG-B field 1105 may not be usable. To address puncturing, the STA may be configured to look for RU allocation tables in specific locations. In some such implementations, the STA may determine a puncture mode associated with the resources allocated by the message. The STA may determine the puncture mode based on information included in a SIG-A field or in another field of the message (for example, an MU PPDU).

For example, if no puncturing exists, the STA may determine RU allocation tables using any of the relevant subbands 1145. In another example, if the message indicates a puncture mode 1, the STA may look for the RU allocation tables for the first content channels 1135 in the first subband 1145-*a* and may look for the RU allocation tables for the second content channels 1140 in the third subband 1145-*c*. In yet another example, if the message indicates a puncture mode 2, the STA may look for the RU allocation tables for the first content channels 1135 in the first subband 1145-*a* and may look for the RU allocation tables for the second content channels 1140 in the fourth subband 1145-*d*. In other examples, additional puncture modes may exist with additional distributions of subbands that include the RU allocation tables. These examples show how the STA may identify a subband that includes the relevant RU allocation table information or how the STA may select a subband from a set of two subbands in a content channel. Once the STA determines the RU allocation tables, the STA may communicate with an access point using the RU allocations.

Figure 11B:
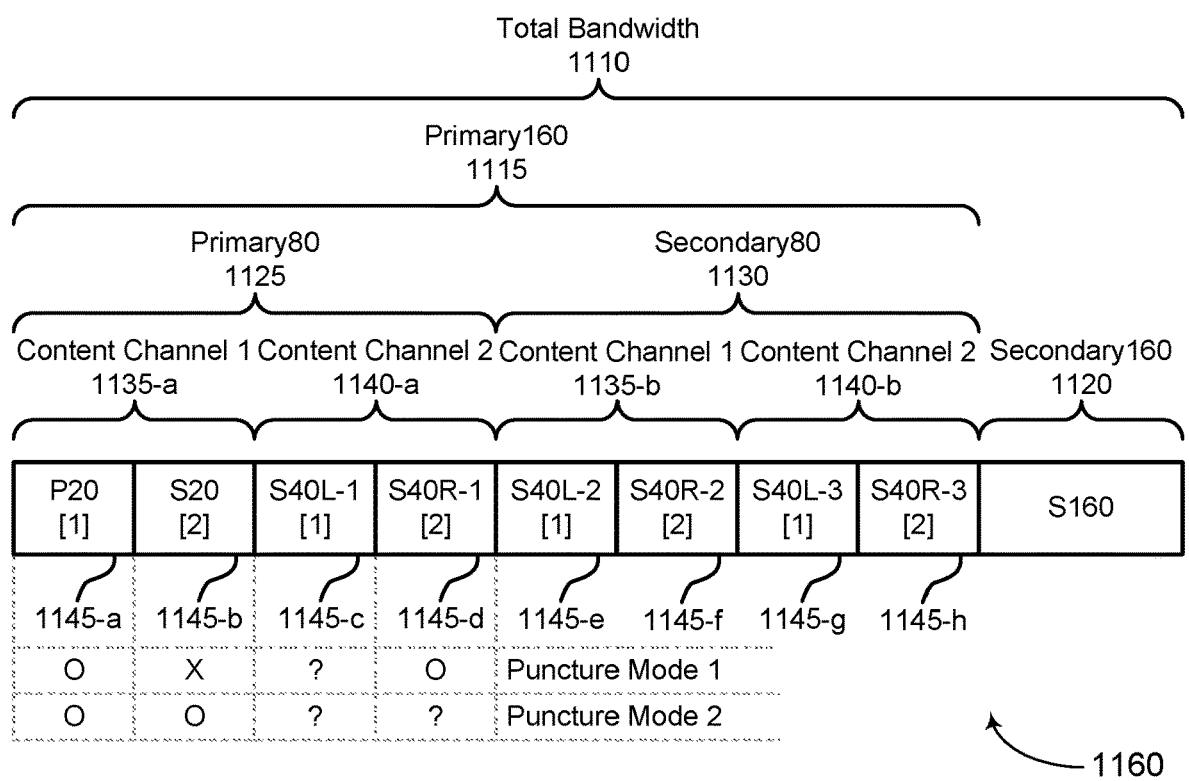
FIG. 11B shows an example of a SIG-B field usable for wireless communications between an AP and one or more STAs according to some implementations.

FIG. 11B shows an example of a SIG-B field 1160 usable for wireless communications between an AP and one or more STAs according to some implementations. The SIG-B field 1160 may be similar to the SIG-B field 1105. As such, fields that are similarly named or numbered may be implemented similarly and full descriptions of such features are not repeated here.

The SIG-B field 1160 may be divided into a primary 160 MHz ("primary160") 1115 and a secondary 160 MHz ("secondary160") 1120. The primary160 1115 may be divided into a primary 80 MHz ("primary80") 1125 and a secondary 80 MHz ("secondary80") 1130, which may be further divided into a plurality of first content channels 1135 (for example, first content channels 1135-*a*, 1135-*b*) and a plurality of second content channels 1140 (for example, second content channels 1140-*a*, 1140-*b*). As such, the SIG-B field 1160 may include a bandwidth that includes a plurality of content channels. For example, the SIG-B field 1160 may include one or more of first content channels 1135, or one or more of second content channels 1140, or a combination thereof.

In the SIG-B field 1160, the RU allocation tables for the first content channels 1135 may be included in a single subband, for example in subband 1145-*a*, and the RU allocation tables for the second content channels 1140 may be included in a single subband, for example in subband 1145-*b*. With such a structure, the STA may be configured to determine the RU allocations for the entire SIG-B field 1160 by decoding a portion of the SIG-B field 1160 (for example, the primary80 1125). This may help the STA conserve power.

The subbands 1145 of the SIG-B field 1160 may be organized into a repeating structure where subbands include specific RU allocation tables to facilitate the STA in conserving power. The SIG-B field 1160 may be an example of a [1 2 1 2] structure of subbands. In such a structure, a first subband 1145-*a* in the first content channel 1135-*a* and a third subband 1145-*c* in the second content channel 1140-*a* may each include RU allocation tables for the first content channels 1135, and a second subband 1145-*b* in the first content channel 1135-*a* and a fourth subband 1145-*d* of the second content channel 1140-*a* may each include RU allocation tables for the second content channels 1140. This pattern may be in the primary80 1125. In some implementations, this pattern may be repeated throughout the entire SIG-B field 1160. The STA may be configured to decode either one of the second subband 1145-*b* or the fourth subband 1145-*d* to determine the RU allocation tables for the second content channels 1140. The STA may be configured to decode either one of the first subband 1145-*a* or the third subband 1145-*c* to determine the RU allocation tables for the first content channels 1135.

In some implementations, the message, including the SIG-B field 1160, may cover a bandwidth that is large enough that the frequency resources are punctured, or are not contiguous. To address puncturing, the STA may be configured to look for RU allocation tables in specific locations. The STA may determine a puncture mode associated with the resources allocated by the message.

For example, if no puncturing exists, the STA may determine RU allocation tables using any of the relevant subbands 1145 of the SIG-B field 1160. In another example, if the message indicates a puncture mode 1, the STA may look for the RU allocation tables for the first content channels 1135 in the first subband 1145-*a* and may look for the RU allocation tables for the second content channels 1140 in the fourth subband 1145-*d*. In yet another example, if the message indicates a puncture mode 2, the STA may look for the RU allocation tables for the first content channels 1135 in the first subband 1145-*a* and may look for the RU allocation tables for the second content channels 1140 in the second subband 1145-*b*. In other examples, additional puncture modes may exist with additional distributions of subbands that include the RU allocation tables. These examples show how the STA may identify a subband that includes the relevant RU allocation table information or how the STA may select a subband from a set of two subbands in a content channel. Once the STA determines the RU allocation tables, the STA may communicate with an access point using the RU allocations. The STA may determine the puncture mode based on information included in a SIG-A field or in another field of the message (for example, an MU PPDU).

Figure 12:
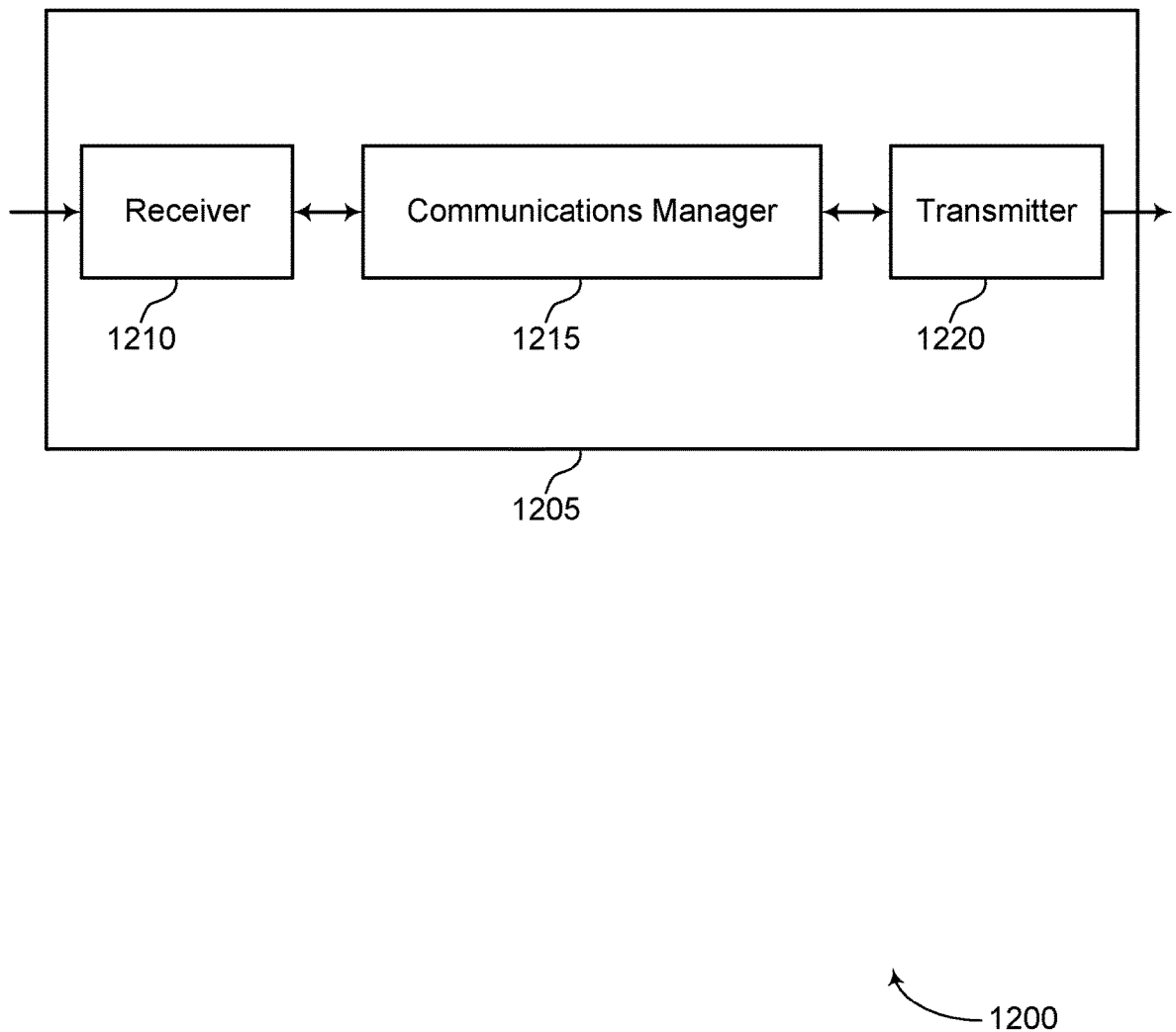
FIGS. 12 and 13 show block diagrams of devices for use in wireless communication according to some implementations.

FIG. 12 shows a block diagram 1200 of a device 1205 for use in wireless communication according to some implementations. The device 1205 may be an example of aspects of a STA as described herein. The device 1205 may include a receiver 1210, a communications manager 1215, and a transmitter 1220. The device 1205 may also include a processor. Each of these components may be in communication with one another (for example, via one or more buses).

Receiver 1210 may receive information such as packets, user data, or control information associated with various information channels (for example, control channels, data channels, and information related to techniques for control signaling in extreme high throughput environments, etc.). Information may be passed on to other components of the device. The receiver 1210 may be an example of aspects of the transceiver 1520 described with reference to FIG. 15. The receiver 1210 may utilize a single antenna or a set of antennas.

The communications manager 1215 may receive a message allocating resources for communication with an access point, determine a compression mode of at least a portion of the message, determine an identifier of a starting spatial stream allocated to the wireless communication device by the message based on the compression mode, determine a number of spatial streams allocated to the wireless communication device by the message based on the compression mode, and communicate with the access point based on the identifier of the starting spatial stream and the number of spatial streams allocated to the wireless communication device by the message. The communications manager 1215 may also receive an EHT message allocating resources for communication with an access point, determine a compression mode of at least a portion of the EHT message, determine a number of spatial streams allocated to the wireless communication device by the message based on the compression mode, and communicate with the access point based on the number of spatial streams allocated to the wireless communication device by the EHT message. The communications manager 1215 may also receive an EHT message allocating resources for communication with an access point, determine that the EHT message includes a SIG-B common field including a set of content channels, identify information included in each content channel of the set of content channels based on the EHT message including the SIG-B common field, each content channel spanning a frequency segment, and communicate with the access point based on identifying the information included in each content channel of the set of content channels. The communications manager 1215 may be an example of aspects of the communications manager 1510 described herein.

The communications manager 1215 may receive a message allocating resources for communication with an access point, identify a first bandwidth field of the message that indicates that a bandwidth of the resources allocated by the message exceeds a threshold frequency, determine that the bandwidth of the resources being allocated by the message exceeds the threshold frequency based on the first bandwidth field, and communicate with the access point based on determining that the bandwidth of the resources being allocated by the message exceeds the threshold frequency.

The communications manager 1215 may also receive a message allocating resources for communication with an access point, determine that a bandwidth of the resources being allocated by the message exceeds a threshold frequency, determine that the message includes a SIG-B common field including a first content channel spanning a first frequency segment, identify a first subband of the first content channel that spans a second frequency segment that is smaller than the first frequency segment, determine an RU allocation for the first content channel based on the first subband, and communicate with the access point based on determining the RU allocation for the first content channel. The communications manager 1215 may be an example of aspects of the communications manager 1510 described herein.

The communications manager 1215, or its sub-components, may be implemented in hardware, code (for example, software or firmware) executed by a processor, or any combination thereof. If implemented in code executed by a processor, the functions of the communications manager 1215, or its sub-components may be executed by a general-purpose processor, a digital signal processor (DSP), an ASIC, a FPGA or other programmable logic device, discrete gate or transistor logic, discrete hardware components, or any combination thereof designed to perform the functions described in the present disclosure.

The communications manager 1215, or its sub-components, may be physically located at different locations, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
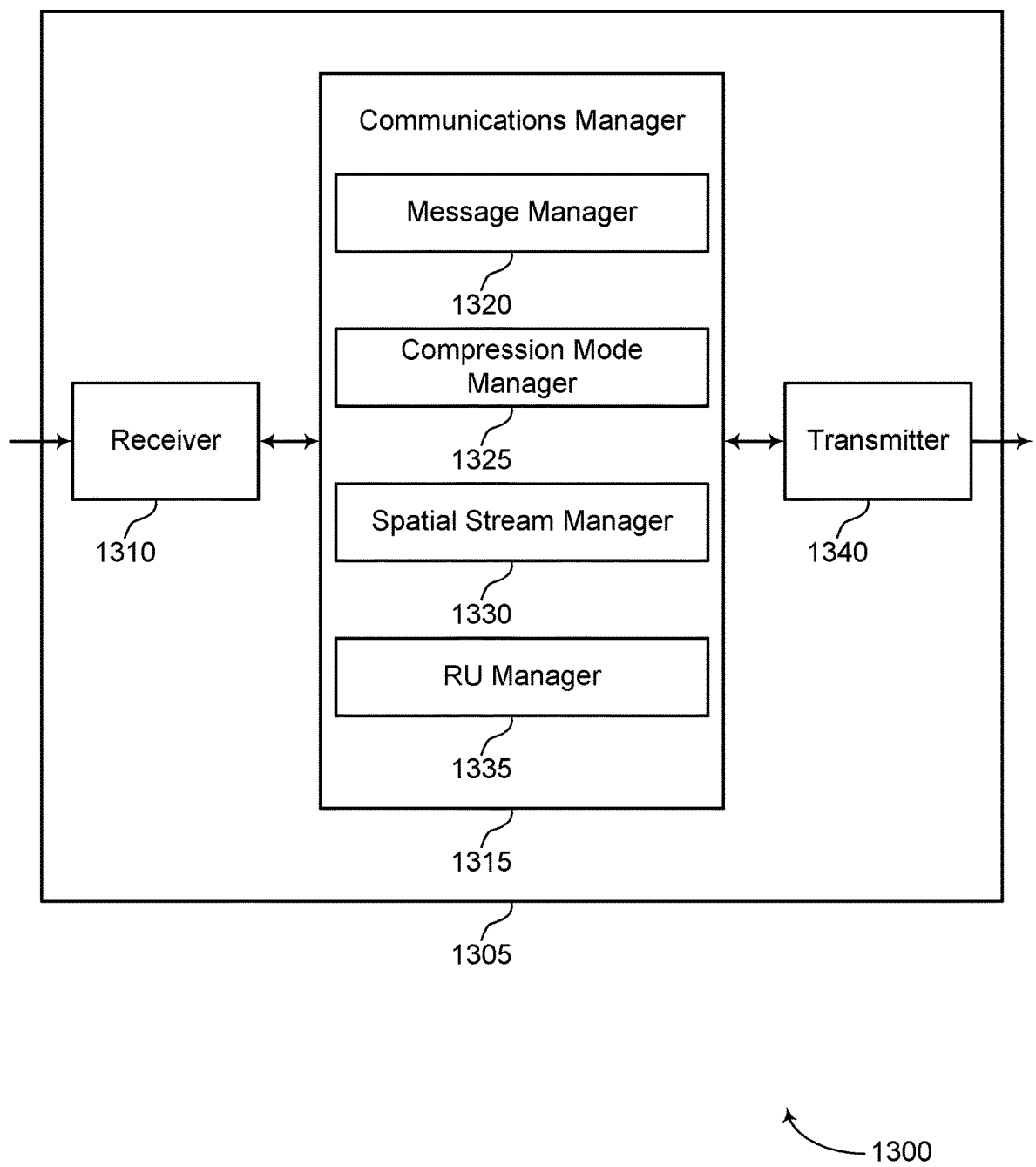

FIG. 13 shows a block diagram 1300 of a device 1305 for use in wireless communication according to some implementations. The device 1305 may be an example of aspects of a device 1205 or a STA 115 as described herein. The device 1305 may include a receiver 1310, a communications manager 1315, and a transmitter 1340. The device 1305 may also include a processor. Each of these components may be in communication with one another (for example, via one or more buses).

Receiver 1310 may receive information such as packets, user data, or control information associated with various information channels (for example, control channels, data channels, and information related to techniques for control signaling in extreme high throughput environments, etc.).

Information may be passed on to other components of the device. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a message manager 1320, a compression mode manager 1325, a spatial stream manager 1330, and an RU manager 1335. The communications manager 1315 may be an example of aspects of the communications manager 1510 described herein.

The message manager 1320 may receive a message allocating resources for communication to a wireless communication device and communicate with an access point based on the starting spatial stream and the number of spatial streams allocated to the wireless communication device by the message. The message manager 1320 may receive an EHT message allocating resources for communication to a wireless communication device and communicate with an access point based on the number of spatial streams allocated to the wireless communication device by the EHT message. The message manager 1320 may receive an EHT message allocating resources for communication to a wireless communication device and communicate with an access point based on interpreting each content channel of the set of content channels.

The message manager 1320 may receive a message allocating resources for communication with an access point, identify a first bandwidth field of the message that indicates that a bandwidth of the resources allocated by the message exceeds a threshold frequency, determine that the bandwidth of the resources being allocated by the message exceeds the threshold frequency based on the first bandwidth field, and communicate with the access point based on determining that the bandwidth of the resources being allocated by the message exceeds the threshold frequency.

The message manager 1320 may receive a message allocating resources for communication with an access point, determine that a bandwidth of the resources being allocated by the message exceeds a threshold frequency, determine that the message includes a SIG-B common field including a first content channel spanning a first frequency segment, identify a first subband of the first content channel that spans a second frequency segment that is smaller than the first frequency segment, determine an RU allocation for the first content channel based on the first subband, and communicate with the access point based on determining the RU allocation for the first content channel.

The compression mode manager 1325 may determine a compression mode of at least a portion of the message. The compression mode manager 1325 may determine a compression mode of at least a portion of the EHT message. The compression mode manager 1325 may determine that the EHT message includes a SIG-B common field including a set of content channels.

The spatial stream manager 1330 may determine a starting spatial stream allocated to the wireless communication device by the message based on the compression mode and determine a number of spatial streams allocated to the wireless communication device by the message based on the compression mode.

The RU manager 1335 may identify information included in each content channel of the set of content based on the EHT message including the SIG-B common field, each content channel spanning a frequency segment.

Transmitter 1340 may transmit signals generated by other components of the device. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
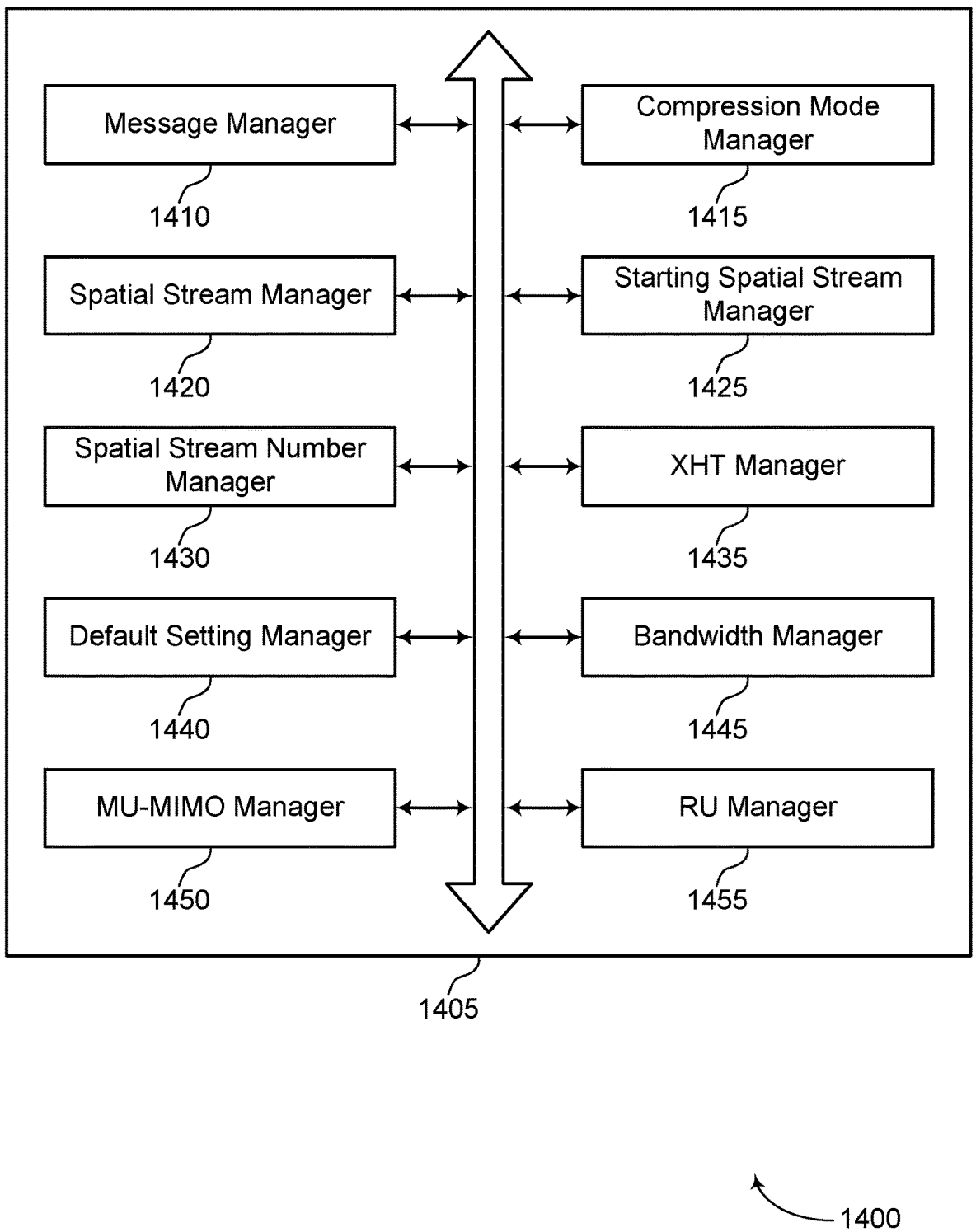
FIG. 14 shows a block diagram of a communications manager for use in wireless communication according to some implementations.

FIG. 14 shows a block diagram 1400 of a communications manager 1405 for use in wireless communication according to some implementations. The communications manager 1405 may be an example of aspects of a communications manager 1215, a communications manager 1315, or a communications manager 1510 described herein. The communications manager 1405 may include a message manager 1410, a compression mode manager 1415, a spatial stream manager 1420, a starting spatial stream manager 1425, a spatial stream number manager 1430, an EHT manager 1435, a default setting manager 1440, a bandwidth manager 1445, a MU-MIMO manager 1450, and an RU manager 1455. Each of these modules may communicate, directly or indirectly, with one another (for example, via one or more buses).

The message manager 1410 may receive a message allocating resources for communication with an access point. In some examples, the message manager 1410 may communicate with the access point based on the starting spatial stream and the number of spatial streams allocated to the wireless communication device by the message. In some examples, the message manager 1410 may receive an EHT message allocating resources for communication with an access point. In some examples, the message manager 1410 may communicate with the access point based on the number of spatial streams allocated to the wireless communication device by the EHT message. In some examples, the message manager 1410 may receive an EHT message allocating resources for communication with an access point. In some examples, the message manager 1410 may communicate with the access point based on interpreting each content channel of the set of content channels.

In some implementations, the message includes a user-specific field for allocating MU-MIMO resources to the wireless communication device. The user-specific field may include one or more of a station identifier field that identifies the wireless communication device, an MCS field, a starting spatial stream field that indicates the identifier of the starting spatial stream allocated to the wireless communication device, a spatial stream number field that indicates the number of spatial streams allocated to the wireless communication device.

In some implementations, the message includes a user-specific field for allocating resources to the wireless communication device. The user-specific field may include one or more of a station identifier field that identifies the wireless communication device, a beamforming field, an MCS field, a dual code modulation field, or a coding field a spatial stream field that indicates the number of spatial streams allocated to the wireless communication device.

The message manager 1410 may receive a message allocating resources for communication with an access point. In some examples, the message manager 1410 may identify a first bandwidth field of the message that indicates that a bandwidth of the resources allocated by the message exceeds a threshold frequency. In some examples, the message manager 1410 may determine that the bandwidth of the resources being allocated by the message exceeds the threshold frequency based on the first bandwidth field. In some examples, the message manager 1410 may communicate with the access point based on determining that the bandwidth of the resources being allocated by the message exceeds the threshold frequency.

In some examples, the message manager 1410 may receive a message allocating resources for communication with an access point. In some examples, the message manager 1410 may determine that a bandwidth of the resources being allocated by the message exceeds a threshold frequency. In some examples, the message manager 1410 may determine that the message includes a SIG-B common field including a first content channel spanning a first frequency segment. In some examples, the message manager 1410 may identify a first subband of the first content channel that spans a second frequency segment that is smaller than the first frequency segment. In some examples, the message manager 1410 may determine an RU allocation for the first content channel based on the first subband. In some examples, the message manager 1410 may communicate with the access point based on determining the RU allocation for the first content channel.

The compression mode manager 1415 may determine a compression mode of at least a portion of the message. In some examples, the compression mode manager 1415 may determine a compression mode of at least a portion of the EHT message. In some examples, the compression mode manager 1415 may determine that the EHT message includes a SIG-B common field including a set of content channels.

In some examples, the compression mode manager 1415 may determine that a SIG-B common field is absent from in the message based on the compression mode of the message. In some examples, the compression mode manager 1415 may determine that a SIG-B common field is included in the EHT message based on determining the compression mode of the message. In some examples, the compression mode manager 1415 may determine a compression mode of the EHT message, where determining that the EHT message include the SIG-B common field is based on determining the compression mode. In some implementations, the compression mode manager 1415 may interpret the EHT message based on the compression mode.

The spatial stream manager 1420 may determine an identifier of a starting spatial stream allocated to the wireless communication device by the message based on the compression mode. In some examples, the spatial stream manager 1420 may determine a number of spatial streams allocated to the wireless communication device by the message based on the compression mode. In some implementations, the spatial stream field includes four bits. In some examples, the spatial stream manager 1420 may determine a number of spatial streams allocated to the wireless communication device by the message based on the interpretation, where determining that the EHT message include the SIG-B common field is based on determining the number of spatial streams.

The starting spatial stream manager 1425 may identify a starting spatial stream field in the message, where determining the starting spatial stream including identifying an identifier of the starting spatial stream based on the starting spatial stream field. In some implementations, the starting spatial stream field includes four bits.

The spatial stream number manager 1430 may identify a spatial stream number field in the message, where determining the number of spatial streams includes identifying the number of spatial streams based on the spatial stream number field. In some implementations, the spatial stream number field includes two bits.

The EHT manager 1435 may determine that the message includes an EHT message, where determining the identifier of the starting spatial stream and determining the number of spatial streams is based on determining that the message is the EHT message. In some examples, the EHT manager 1435 may interpret the message based on the message being the EHT message and the compression mode. In some examples, the EHT manager 1435 may interpret the EHT message based on the compression mode, where determining the number of spatial streams allocated to the wireless communication device is based on the interpretation. In some implementations, the EHT manager 1435 may determine that a bandwidth of the resources being allocated by the EHT message is equal to or less than 160 MHz, where identifying the information included in each content channel of the set of content channels is based on determining that the bandwidth of the resources being allocated by the EHT message is equal to or less than 160 MHz. In some implementations, the EHT manager 1435 may determine that a number of spatial streams allocatable by the EHT message exceeds eight spatial streams, where identifying the information included in each content channel of the set of content channels is based on determining that the number of spatial streams allocatable by the EHT message exceeds eight spatial streams.

In some implementations, the EHT message includes a user-specific field for allocating non-multiple user multiple in multiple out (non-MU-MIMO) resources to the wireless communication device. In some implementations, the user-specific field includes a station identifier field that identifies the wireless communication device, a beamforming field, an MCS field, a dual code modulation field, and a spatial stream field that indicates the number of spatial streams allocated to the wireless communication device.

In some implementations, the EHT message includes a user-specific field for allocating non-MU-MIMO resources to the wireless communication device. In some implementations, the user-specific field includes a station identifier field that identifies the wireless communication device, a beamforming field, an MCS field, a coding field, and a spatial stream field that indicates the number of spatial streams allocated to the wireless communication device.

The default setting manager 1440 may determine that a coding field is absent from a user-specific field of the message associated with the wireless communication device based on the message being an EHT message and the compression mode. In some examples, the default setting manager 1440 may determine that the resources use a LDPC code based on determining that the message the coding field is absent from the message, where communicating with the access point is based on determining that the resources use the LDPC.

In some examples, the default setting manager 1440 may determine a default error correcting code based on the user-specific field, where communicating with the access point is based on the default error correcting code. In some examples, the default setting manager 1440 may determine a default setting of a DCM scheme for the resources allocated to the wireless communication device, where communicating with the access point is based on the default setting of the DCM scheme. In some implementations, the default error correcting code includes a LDPC code or a BCC code. In some implementations, the default setting includes refraining from performing the DCM scheme.

The bandwidth manager 1445 may determine that a bandwidth of the resources being allocated by the message exceeds 160 MHz, where determining the identifier of the starting spatial stream and determining the number of spatial streams is based on determining that the bandwidth of the resources being allocated by the message exceeds 160 MHz.

The bandwidth manager 1445 may identify a second bandwidth field of the message configured to indicate the bandwidth of the resources being allocated by the message when the first bandwidth field indicates that the bandwidth is less than or equal to the threshold frequency and configured to indicate a puncture mode of the resources allocated by the message when the first bandwidth field indicates that the bandwidth exceeds the threshold frequency. In some examples, the bandwidth manager 1445 may determine the puncture mode of the resources allocated by the message based on identifying the second bandwidth field. In some examples, the bandwidth manager 1445 may determine a default setting for spatial reuse of the resources allocated by the message based on the first bandwidth field in the message, where communicating with the access point is based on the default setting for the spatial reuse. In some examples, determining that the message includes an EHT message based on the first bandwidth field indicating that the bandwidth exceeds the threshold frequency, where communicating with the access point is based on determining that the message includes the EHT message. In some implementations, the second bandwidth field includes up to three bits. In some implementations, the second bandwidth field includes a portion of a SIG-A field. In some implementations, the threshold frequency is 160 MHz. In some implementations, the first bandwidth field includes one bit. In some implementations, the first bandwidth field includes a portion of a SIG-A field. In some implementations, the bandwidth of the resources allocated by the message is 320 MHz. In some implementations, the first bandwidth field and the second bandwidth field may be located in a SIG-A field of the message (for example, the MU PPDU).

The MU-MIMO manager 1450 may determine that a number of wireless communication devices being allocated resources by the message exceeds eight wireless communication devices, where determining the identifier of the starting spatial stream and determining the number of spatial streams is based on determining that the number of wireless communication devices being allocated resources by the message exceeds eight wireless communication devices. In some examples, the MU-MIMO manager 1450 may determine that a number of spatial streams allocatable by the message exceeds eight spatial streams, where determining the identifier of the starting spatial stream and determining the number of spatial streams is based on determining that the number of spatial streams allocatable by the message exceeds eight spatial streams.

In some examples, the MU-MIMO manager 1450 may determine whether a number of tones in an RU satisfies a threshold. In some examples, the MU-MIMO manager 1450 may apply MU-MIMO to the RU that satisfies the threshold. In some implementations, the threshold includes 242 tones.

The RU manager 1455 may identify information included in each content channel of the set of content channels based on the EHT message including the SIG-B common field, each content channel spanning a frequency segment. In some examples, the RU manager 1455 may determine the frequency segment spanned by each content channel of the set of content channels, where identifying the information included in each content channel is based on determining the frequency segment. In some examples, the RU manager 1455 may determine a portion of the RU allocation table associated with the EHT message, where identifying the information included in each content channel is based on the portion of the RU allocation table associated with the EHT message. In some implementations, the frequency segment spanned by each content channel of the set of content channels is 40 MHz.

The RU manager 1455 may identify a second subband of a second content channel of the SIG-B common field, the second content channel spanning a third frequency segment and the second subband spanning a fourth frequency segment that is smaller than the third frequency segment. In some examples, the RU manager 1455 may determine an RU allocation for the second content channel based on the second subband, where communicating with the access point is based on determining the RU allocation for the second content channel. In some examples, determining a puncture mode associated with the resources allocated by the message, where identifying the second subband of the second content channel further includes. In some examples, the RU manager 1455 may determine a puncture mode associated with the resources allocated by the message.

In some examples, the RU manager 1455 may determine whether an RU allocation for a second content channel of the SIG-B common field is included in a second subband of the first content channel or in a third subband of the second content channel based on determining the puncture mode, where communicating with the access point is based on determining whether the RU allocation for the second content channel is included in the second subband of the first content channel or in the third subband of the second content channel.

In some examples, the RU manager 1455 may determine the RU allocation for the second content channel using either the second subband or the third subband based on determining whether the RU allocation for the second content channel is included in the second subband of the first content channel or in the third subband of the second content channel, where communicating with the access point is based on determining the RU allocation for the second content channel. In some cases, the first frequency segment is 40 MHz. In some cases, the second frequency segment is 20 MHz. In some cases, the threshold frequency is 160 MHz. In some cases, the first content channel includes the first subband spanning the second frequency segment and a second subband spanning a third frequency segment that is smaller than the first frequency segment.

In some cases, a second content channel of the SIG-B common field that spans a fourth frequency segment includes a third subband spanning a fifth frequency segment smaller than the fourth frequency segment and a fourth subband spanning a sixth frequency that is smaller than the fourth frequency segment. In some cases, the first subband of the first content channel and the third subband of the second content channel include RU allocations for the first content channel. In some cases, the second subband of the first content channel and the fourth subband of the second content channel include RU allocations for the second content channel. In some cases, the first subband, the second subband, the third subband, and the fourth subband of the SIG-B common field include a [1 2 1 2] structure. In some cases, the first subband of the first content channel and the second subband of the first content channel include RU allocations for the first content channel. In some cases, the third subband of the second content channel and the fourth subband of the second content channel include RU allocations for the second content channel. In some cases, the first subband, the second subband, the third subband, and the fourth subband of the SIG-B common field include a [1 1 2 2] structure.

Figure 15:
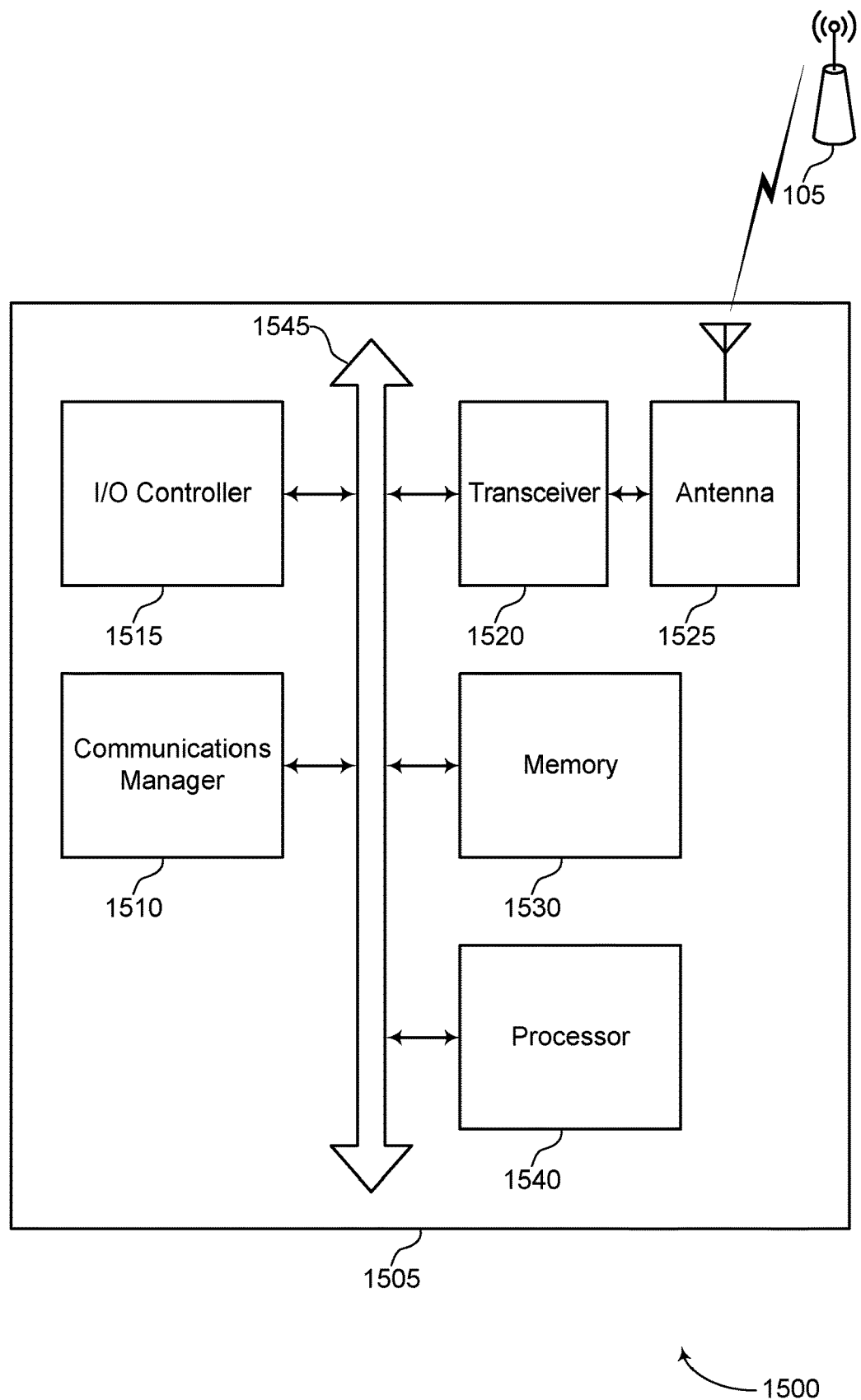
FIG. 15 shows a diagram of a system including a device for use in wireless communication according to some implementations.

FIG. 15 shows a diagram of a system 1500 including a device 1505 for use in wireless communication according to some implementations. The device 1505 may be an example of or include the components of device 2015, device 1305, or a STA as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (for example, bus 1545).

The communications manager 1510 may receive a message allocating resources for communication with an access point, determine a compression mode of at least a portion of the message, determine an identifier of a starting spatial stream allocated to the wireless communication device by the message based on the compression mode, determine a number of spatial streams allocated to the wireless communication device by the message based on the compression mode, and communicate with the access point based on the identifier of the starting spatial stream and the number of spatial streams allocated to the wireless communication device by the message. The communications manager 1510 may also receive an EHT message allocating resources for communication with an access point, determine a compression mode of at least a portion of the EHT message, determine a number of spatial streams allocated to the wireless communication device by the message based on the compression mode, and communicate with the access point based on the number of spatial streams allocated to the wireless communication device by the EHT message. The communications manager 1510 may also receive an EHT message allocating resources for communication with an access point, determine that the EHT message includes a SIG-B common field including a set of content channels, identify information included in each content channel of the set of content channels based on the EHT message including the SIG-B common field, each content channel spanning a frequency segment, and communicate with the access point based on identifying the information included in each content channel of the set of content channels.

I/O controller 1515 may manage input and output signals for device 1505. I/O controller 1515 may also manage peripherals not integrated into device 1505. In some implementations, I/O controller 1515 may represent a physical connection or port to an external peripheral. In some implementations, I/O controller 1515 may utilize an operating system such as iOS®, ANDROID®, MS-DOS®, MS-WINDOWS®, OS/2®, UNIX®, LINUX®, or another known operating system. In other implementations, I/O controller 1515 may represent or interact with a modem, a keyboard, a mouse, a touchscreen, or a similar device. In some implementations, I/O controller 1515 may be implemented as part of a processor. In some implementations, a user may interact with device 1505 via I/O controller 1515 or via hardware components controlled by I/O controller 1515.

Transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some implementations, the wireless communication device may include a single antenna 1525. However, in some implementations the device may have more than one antenna 1525, which may be capable of concurrently transmitting or receiving multiple wireless transmissions.

Memory 1530 may include RAM and ROM. The memory 1530 may store computer-readable, computer-executable software 1535 including instructions that, when executed, cause the processor to perform various functions described herein. In some implementations, the memory 1530 may contain, among other things, a BIOS which may control basic hardware or software operation such as the interaction with peripheral components or devices.

Processor 1540 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, processor 1540 may be configured to operate a memory array using a memory controller. In other implementations, a memory controller may be integrated into processor 1540. Processor 1540 may be configured to execute computer-readable instructions stored in a memory to perform various functions (for example, functions or tasks supporting techniques for control signaling in extreme high throughput environments).

Figure 16:
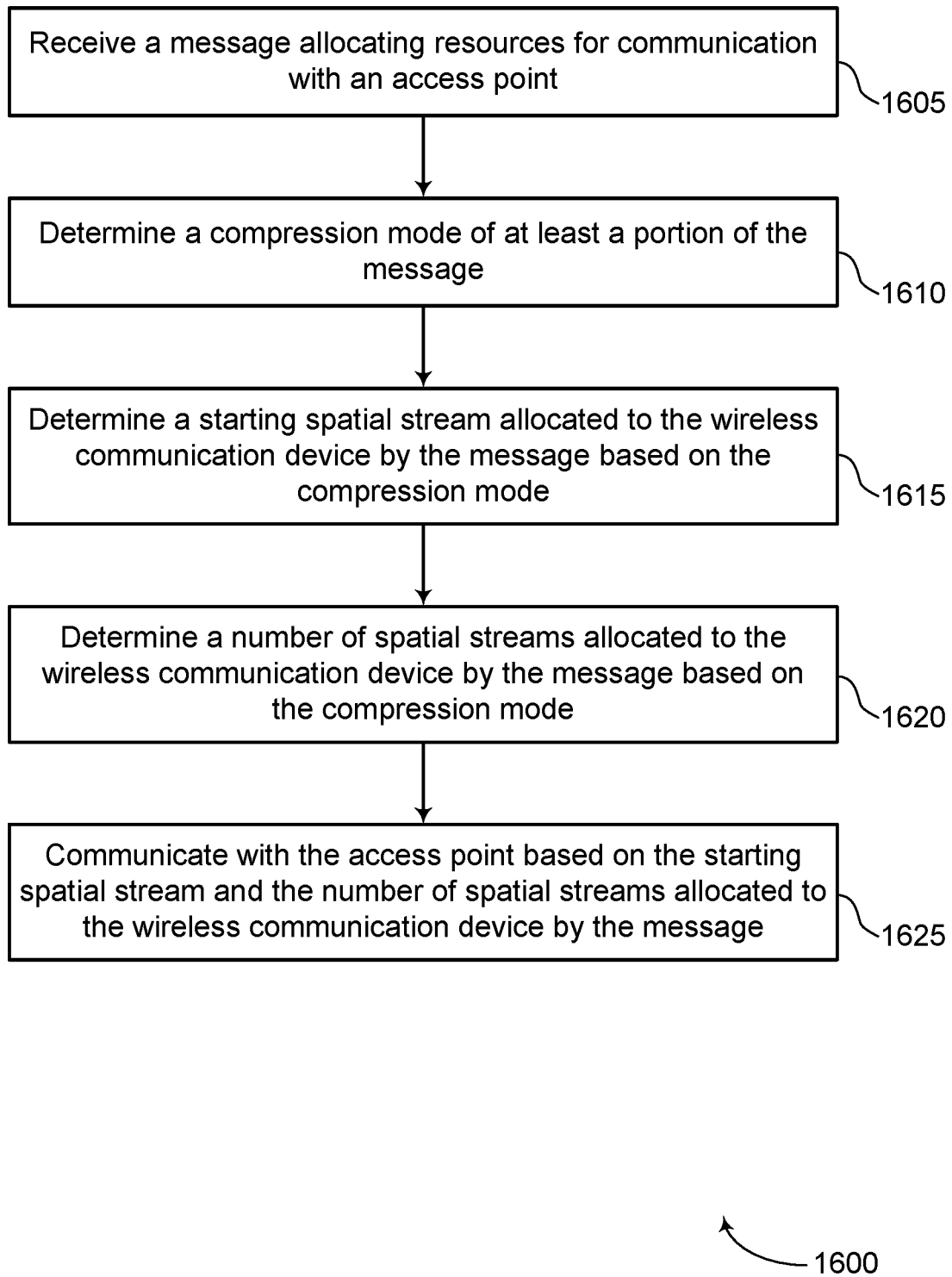
FIGS. 16 through 22 show flowcharts illustrating methods for use in wireless communication according to some implementations.

FIG. 16 shows a flowchart illustrating a method 1600 for use in wireless communication according to some implementations. The operations of method 1600 may be implemented by a STA or its components as described herein. For example, the operations of method 1600 may be performed by a communications manager as described with reference to FIGS. 12 through 15. In some examples, a STA may execute a set of instructions to control the functional elements of the STA to perform the functions described below. Additionally or alternatively, a STA may perform aspects of the functions described below using special-purpose hardware.

At 1605, the STA may receive a message allocating resources for communication with an access point. The operations of 1605 may be performed according to the methods described herein. In some examples, aspects of the operations of 1605 may be performed by a message manager as described with reference to FIGS. 12 through 15.

At 1610, the STA may determine a compression mode of at least a portion of the message. The operations of 1610 may be performed according to the methods described herein. In some examples, aspects of the operations of 1610 may be performed by a compression mode manager as described with reference to FIGS. 12 through 15.

At 1615, the STA may determine a starting spatial stream allocated to the wireless communication device by the message based on the compression mode. The operations of 1615 may be performed according to the methods described herein. In some examples, aspects of the operations of 1615 may be performed by a spatial stream manager as described with reference to FIGS. 12 through 15.

At 1620, the STA may determine a number of spatial streams allocated to the wireless communication device by the message based on the compression mode. The operations of 1620 may be performed according to the methods described herein. In some examples, aspects of the operations of 1620 may be performed by a spatial stream manager as described with reference to FIGS. 12 through 15.

At 1625, the STA may communicate with an access point based on the starting spatial stream and the number of spatial streams allocated to the wireless communication device by the message. The operations of 1625 may be performed according to the methods described herein. In some examples, aspects of the operations of 1625 may be performed by a message manager as described with reference to FIGS. 12 through 15.

Figure 17:
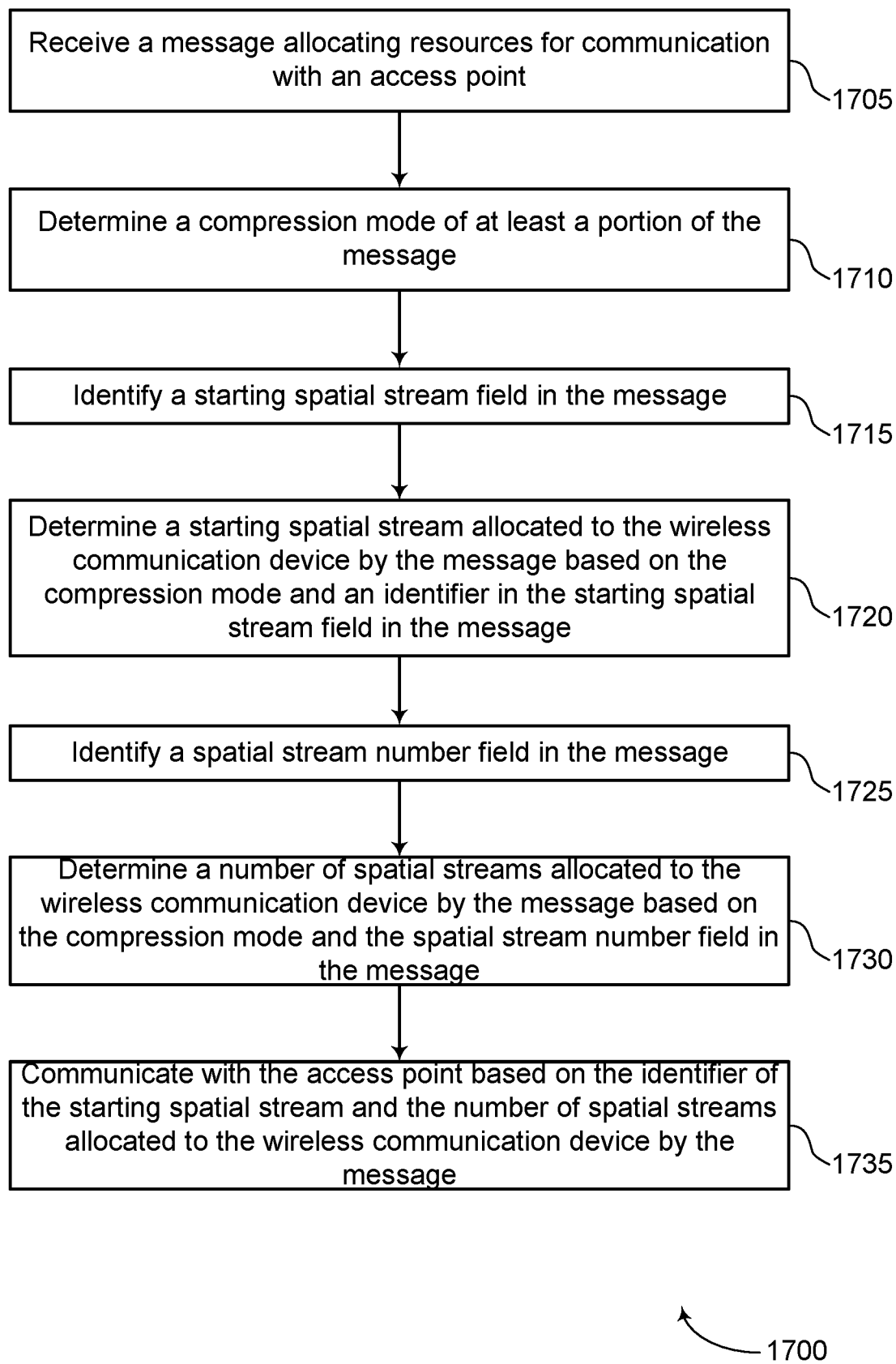

FIG. 17 shows a flowchart illustrating a method 1700 for use in wireless communication according to some implementations. The operations of method 1700 may be implemented by a STA or its components as described herein. For example, the operations of method 1700 may be performed by a communications manager as described with reference to FIGS. 12 through 15. In some examples, a STA may execute a set of instructions to control the functional elements of the STA to perform the functions described below. Additionally or alternatively, a STA may perform aspects of the functions described below using special-purpose hardware.

At 1705, the STA may receive a message allocating resources for communication with an access point. The operations of 1705 may be performed according to the methods described herein. In some examples, aspects of the operations of 1705 may be performed by a message manager as described with reference to FIGS. 12 through 15.

At 1710, the STA may determine a compression mode of at least a portion of the message. The operations of 1710 may be performed according to the methods described herein. In some examples, aspects of the operations of 1710 may be performed by a compression mode manager as described with reference to FIGS. 12 through 15.

At 1715, the STA may identify a starting spatial stream field in the message. The operations of 1715 may be performed according to the methods described herein. In some examples, aspects of the operations of 1715 may be performed by a starting spatial stream manager as described with reference to FIGS. 12 through 15.

At 1720, the STA may determine starting spatial stream allocated to the wireless communication device by the message based on the compression mode and an identifier in the starting spatial stream field in the message. The operations of 1720 may be performed according to the methods described herein. In some examples, aspects of the operations of 1720 may be performed by a spatial stream manager as described with reference to FIGS. 12 through 15.

At 1725, the STA may identify a spatial stream number field in the message. The operations of 1725 may be performed according to the methods described herein. In some examples, aspects of the operations of 1725 may be performed by a spatial stream number manager as described with reference to FIGS. 12 through 15.

At 1730, the STA may determine a number of spatial streams allocated to the wireless communication device by the message based on the compression mode and the spatial stream number field in the message. The operations of 1730 may be performed according to the methods described herein. In some examples, aspects of the operations of 1730 may be performed by a spatial stream manager as described with reference to FIGS. 12 through 15.

At 1735, the STA may communicate with an access point based on the identifier of the starting spatial stream and the number of spatial streams allocated to the wireless communication device by the message. The operations of 1735 may be performed according to the methods described herein. In some examples, aspects of the operations of 1735 may be performed by a message manager as described with reference to FIGS. 12 through 15.

Figure 18:
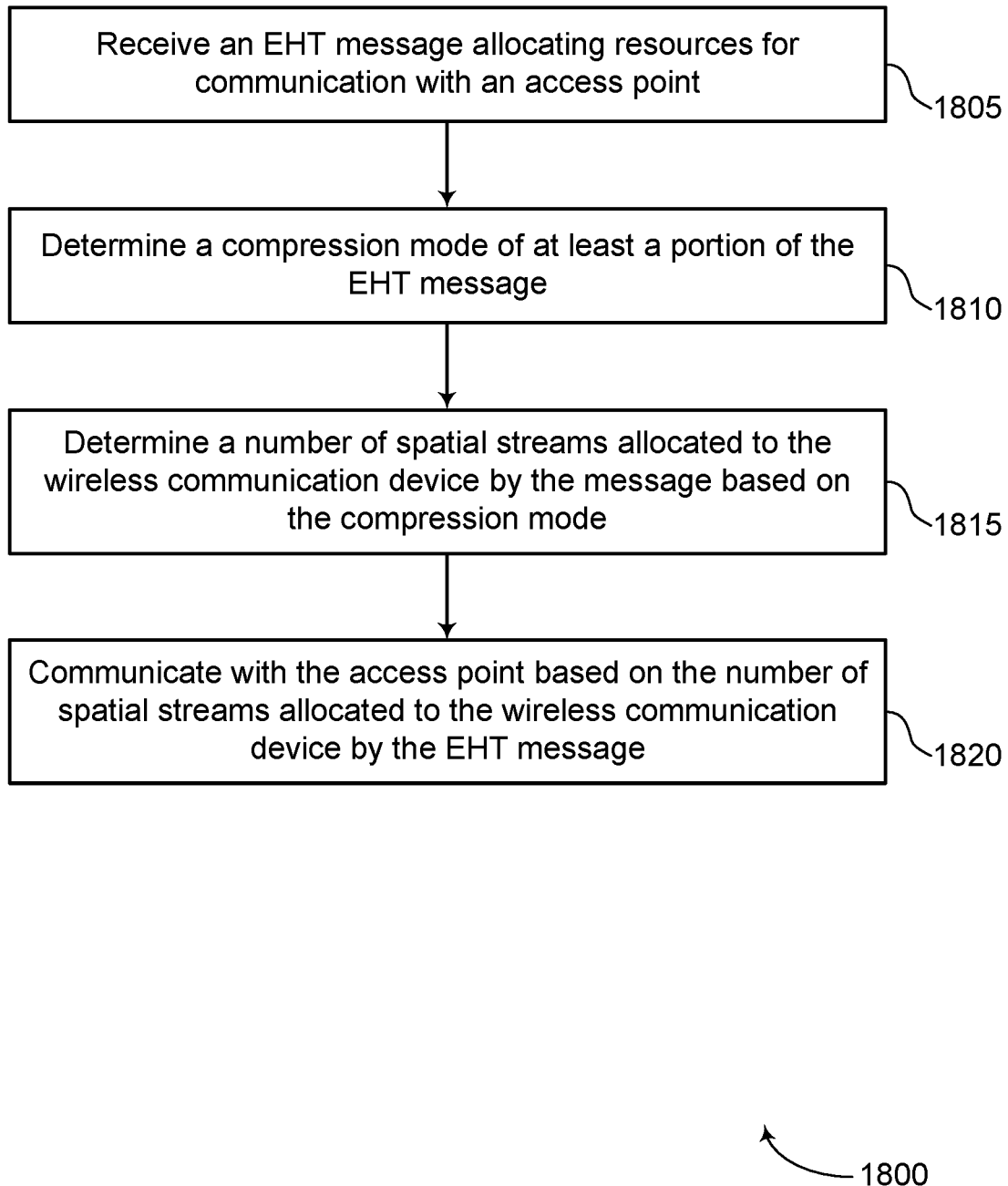

FIG. 18 shows a flowchart illustrating a method 1800 for use in wireless communication according to some implementations. The operations of method 1800 may be implemented by a STA or its components as described herein. For example, the operations of method 1800 may be performed by a communications manager as described with reference to FIGS. 12 through 15. In some examples, a STA may execute a set of instructions to control the functional elements of the STA to perform the functions described below. Additionally or alternatively, a STA may perform aspects of the functions described below using special-purpose hardware.

At 1805, the STA may receive an EHT message allocating resources for communication with an access point. The operations of 1805 may be performed according to the methods described herein. In some examples, aspects of the operations of 1805 may be performed by a message manager as described with reference to FIGS. 12 through 15.

At 1810, the STA may determine a compression mode of at least a portion of the EHT message. The operations of 1810 may be performed according to the methods described herein. In some examples, aspects of the operations of 1810 may be performed by a compression mode manager as described with reference to FIGS. 12 through 15.

At 1815, the STA may determine a number of spatial streams allocated to the wireless communication device by the message based on the compression mode. The operations of 1815 may be performed according to the methods described herein. In some examples, aspects of the operations of 1815 may be performed by a spatial stream manager as described with reference to FIGS. 12 through 15.

At 1820, the STA may communicate with an access point based on the number of spatial streams allocated to the wireless communication device by the EHT message. The operations of 1820 may be performed according to the methods described herein. In some examples, aspects of the operations of 1820 may be performed by a message manager as described with reference to FIGS. 12 through 15.

Figure 19:
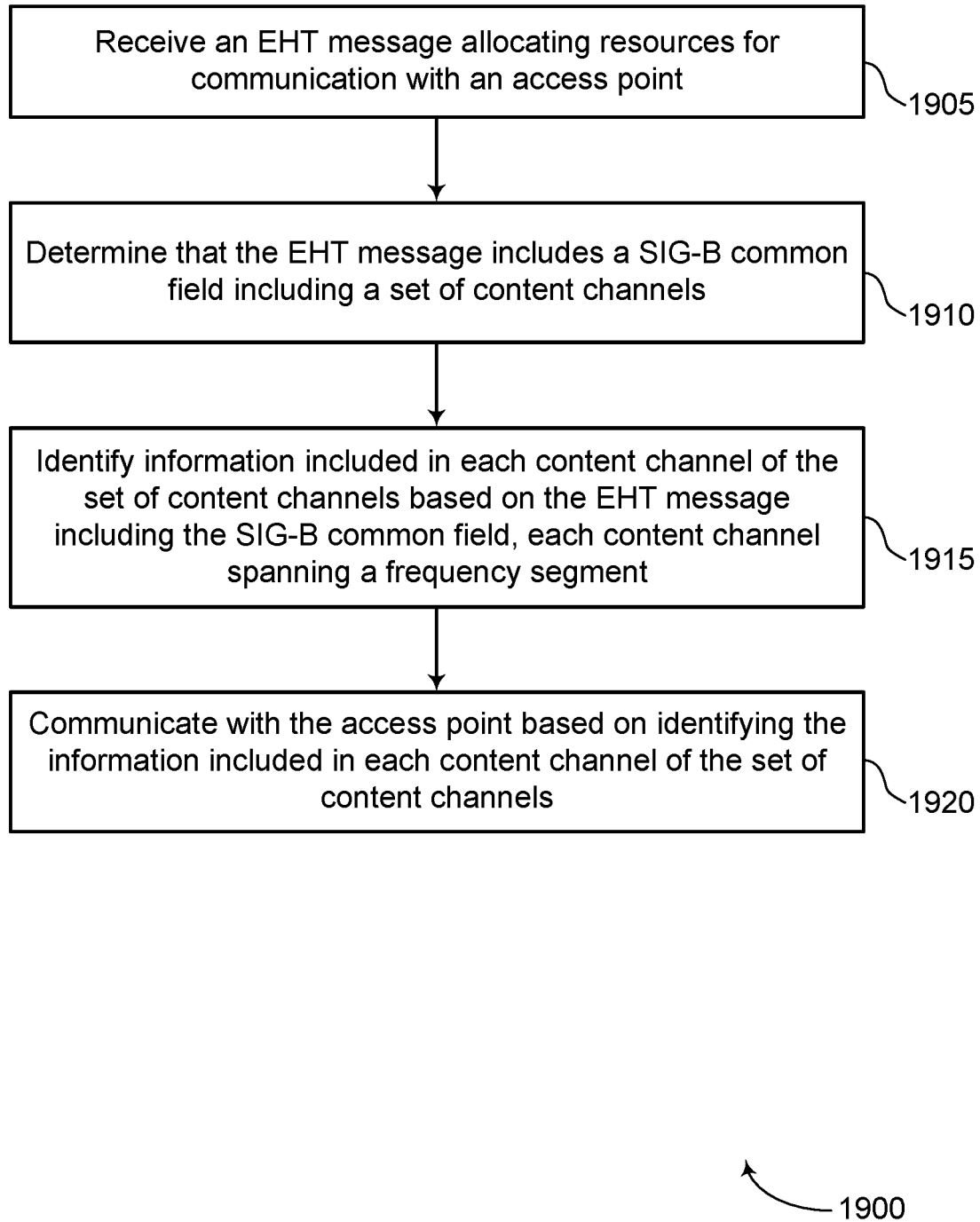

FIG. 19 shows a flowchart illustrating a method 1900 for use in wireless communication according to some implementations. The operations of method 1900 may be implemented by a STA or its components as described herein. For example, the operations of method 1900 may be performed by a communications manager as described with reference to FIGS. 12 through 15. In some examples, a STA may execute a set of instructions to control the functional elements of the STA to perform the functions described below. Additionally or alternatively, a STA may perform aspects of the functions described below using special-purpose hardware.

At 1905, the STA may receive an EHT message allocating resources for communication with an access point. The operations of 1905 may be performed according to the methods described herein. In some examples, aspects of the operations of 1905 may be performed by a message manager as described with reference to FIGS. 12 through 15.

At 1910, the STA may determine that the EHT message includes a SIG-B common field including a set of content channels. The operations of 1910 may be performed according to the methods described herein. In some examples, aspects of the operations of 1910 may be performed by a compression mode manager as described with reference to FIGS. 12 through 15.

At 1915, the STA may identify information included in each content channel of the set of content channels based on the EHT message including the SIG-B common field, each content channel spanning a frequency segment. The operations of 1915 may be performed according to the methods described herein. In some examples, aspects of the operations of 1915 may be performed by an RU manager as described with reference to FIGS. 12 through 15.

At 1920, the STA may communicate with an access point based on identifying the information included in each content channel of the set of content channels. The operations of 1920 may be performed according to the methods described herein. In some examples, aspects of the operations of 1920 may be performed by a message manager as described with reference to FIGS. 12 through 15.

Figure 20:
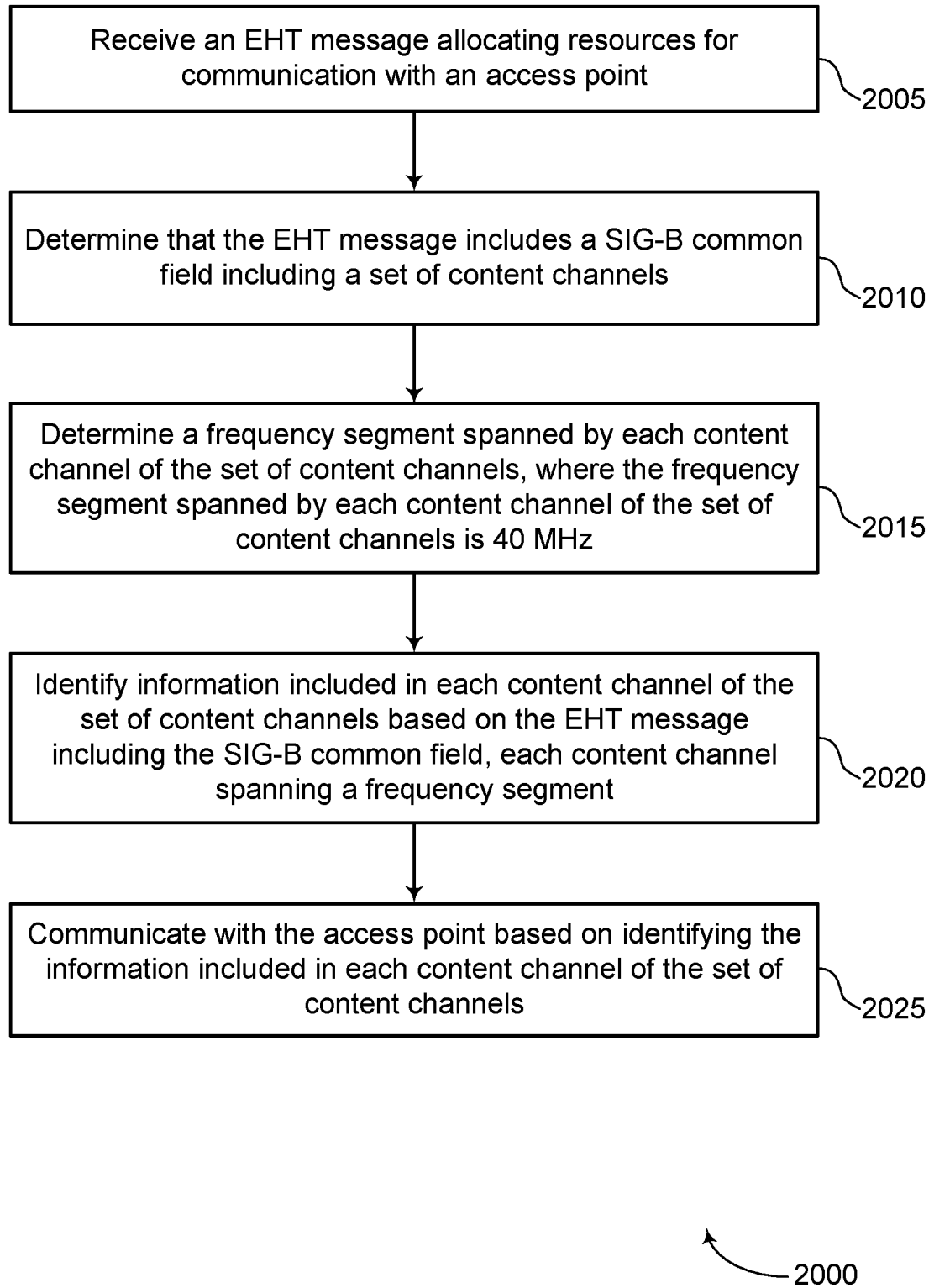

FIG. 20 shows a flowchart illustrating a method 2000 for use in wireless communication according to some implementations. The operations of method 2000 may be implemented by a STA or its components as described herein. For example, the operations of method 2000 may be performed by a communications manager as described with reference to FIGS. 12 through 15. In some examples, a STA may execute a set of instructions to control the functional elements of the STA to perform the functions described below. Additionally or alternatively, a STA may perform aspects of the functions described below using special-purpose hardware.

At 2005, the STA may receive an EHT message allocating resources for communication with an access point. The operations of 2005 may be performed according to the methods described herein. In some examples, aspects of the operations of 2005 may be performed by a message manager as described with reference to FIGS. 12 through 15.

At 2010, the STA may determine that the EHT message includes a SIG-B common field including a set of content channels. The operations of 2010 may be performed according to the methods described herein. In some examples, aspects of the operations of 2010 may be performed by a compression mode manager as described with reference to FIGS. 12 through 15.

At 2015, the STA may determine a frequency segment spanned by each content channel of the set of content channels, where the frequency segment spanned by each content channel of the set of content channels is 40 MHz. The operations of 2015 may be performed according to the methods described herein. In some examples, aspects of the operations of 2015 may be performed by an RU manager as described with reference to FIGS. 12 through 15.

At 2020, the STA may identify information included in each content channel of the set of content channels based on the EHT message including the SIG-B common field, each content channel spanning a frequency segment. The operations of 2020 may be performed according to the methods described herein. In some examples, aspects of the operations of 2020 may be performed by an RU manager as described with reference to FIGS. 12 through 15.

At 2025, the STA may communicate with an access point based on identifying the information included in each content channel of the set of content channels. The operations of 2025 may be performed according to the methods described herein. In some examples, aspects of the operations of 2025 may be performed by a message manager as described with reference to FIGS. 12 through 15.

Figure 21:
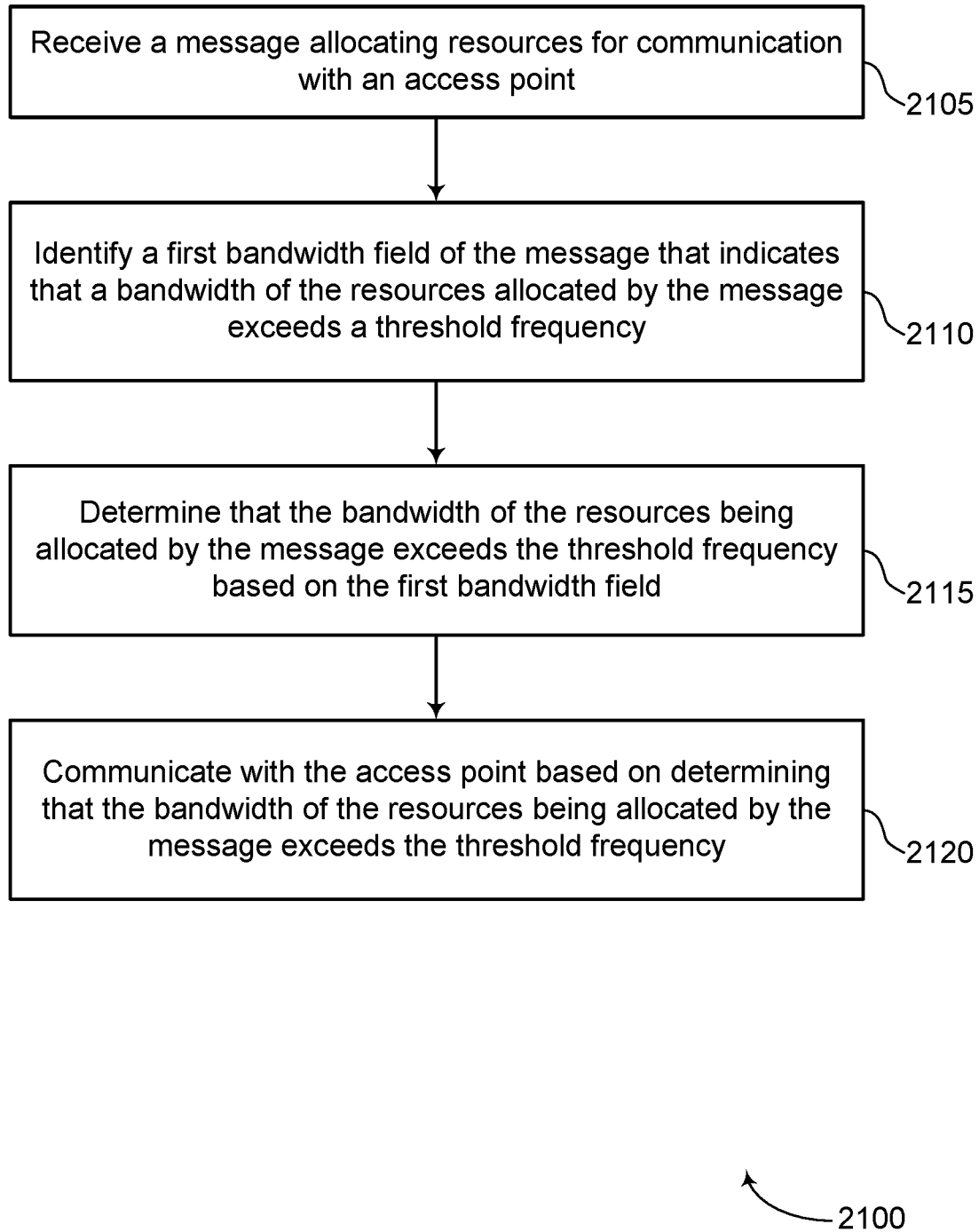

FIG. 21 shows a flowchart illustrating a method 2100 that supports techniques for control signaling in extreme high throughput environments in accordance with aspects of the present disclosure. The operations of method 2100 may be implemented by a STA or its components as described herein. For example, the operations of method 2100 may be performed by a communications manager as described with reference to FIGS. 12 through 15. In some examples, a STA may execute a set of instructions to control the functional elements of the STA to perform the functions described below. Additionally or alternatively, a STA may perform aspects of the functions described below using special-purpose hardware.

At 2105, the STA may receive a message allocating resources for communication with an access point. The operations of 2105 may be performed according to the methods described herein. In some examples, aspects of the operations of 2105 may be performed by a message manager as described with reference to FIGS. 12 through 15.

At 2110, the STA may identify a first bandwidth field of the message that indicates that a bandwidth of the resources allocated by the message exceeds a threshold frequency. The operations of 2110 may be performed according to the methods described herein. In some examples, aspects of the operations of 2110 may be performed by a message manager as described with reference to FIGS. 12 through 15.

At 2115, the STA may determine that the bandwidth of the resources being allocated by the message exceeds the threshold frequency based on the first bandwidth field. The operations of 2115 may be performed according to the methods described herein. In some examples, aspects of the operations of 2115 may be performed by a message manager as described with reference to FIGS. 12 through 15.

At 2120, the STA may communicate with an access point based on determining that the bandwidth of the resources being allocated by the message exceeds the threshold frequency. The operations of 2120 may be performed according to the methods described herein. In some examples, aspects of the operations of 2120 may be performed by a message manager as described with reference to FIGS. 12 through 15.

Figure 22:
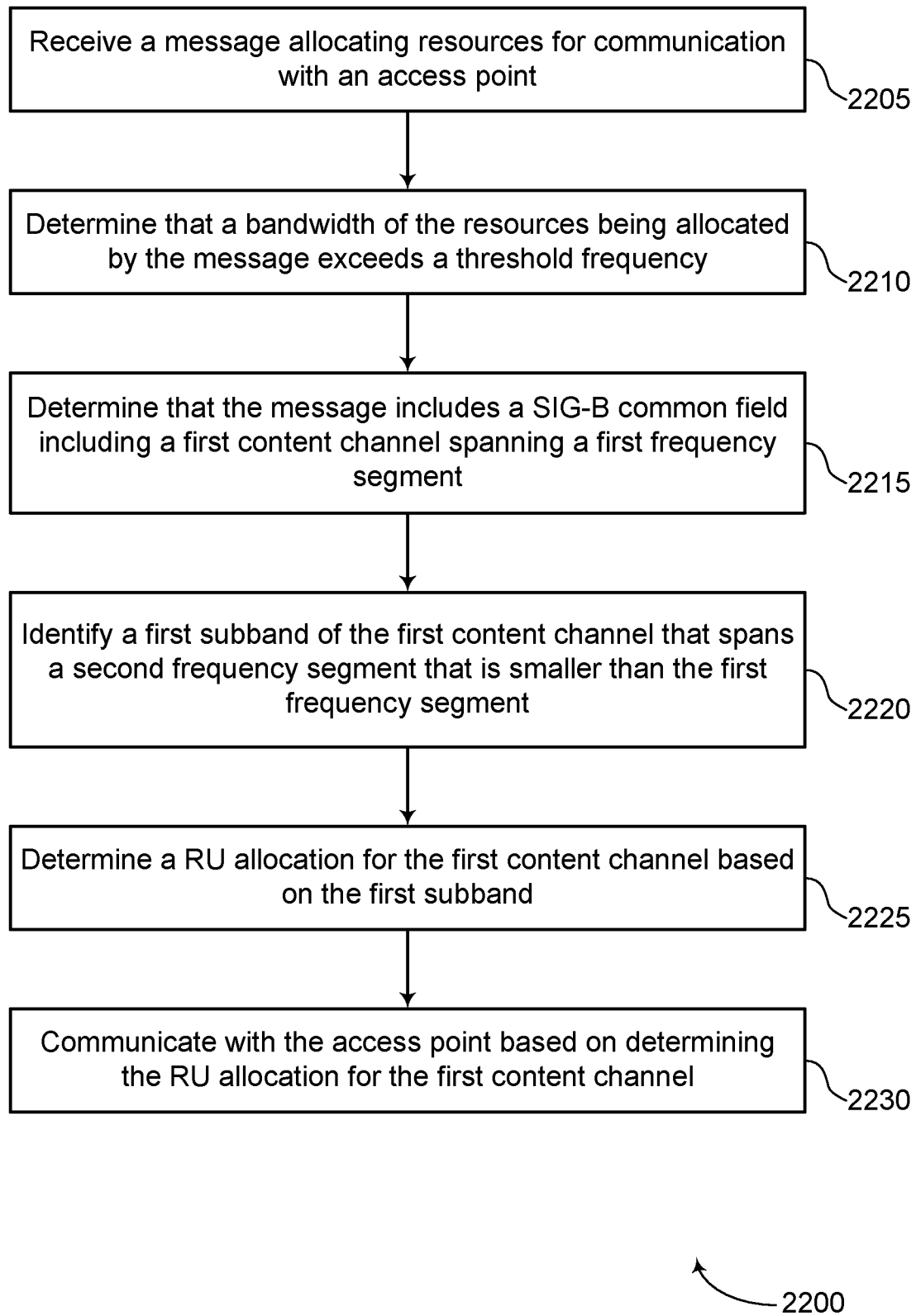

FIG. 22 shows a flowchart illustrating a method 2200 that supports techniques for control signaling in extremely high throughput environments in accordance with aspects of the present disclosure. The operations of method 2200 may be implemented by a STA or its components as described herein. For example, the operations of method 2200 may be performed by a communications manager as described with reference to FIGS. 12 through 15. In some examples, a STA may execute a set of instructions to control the functional elements of the STA to perform the functions described below. Additionally or alternatively, a STA may perform aspects of the functions described below using special-purpose hardware.

At 2205, the STA may receive a message allocating resources for communication with an access point. The operations of 2205 may be performed according to the methods described herein. In some examples, aspects of the operations of 2205 may be performed by a message manager as described with reference to FIGS. 12 through 15.

At 2210, the STA may determine that a bandwidth of the resources being allocated by the message exceeds a threshold frequency. The operations of 2210 may be performed according to the methods described herein. In some examples, aspects of the operations of 2210 may be performed by a message manager as described with reference to FIGS. 12 through 15.

At 2215, the STA may determine that the message includes a SIG-B common field including a first content channel spanning a first frequency segment. The operations of 2215 may be performed according to the methods described herein. In some examples, aspects of the operations of 2215 may be performed by a message manager as described with reference to FIGS. 12 through 15.

At 2220, the STA may identify a first subband of the first content channel that spans a second frequency segment that is smaller than the first frequency segment. The operations of 2220 may be performed according to the methods described herein. In some examples, aspects of the operations of 2220 may be performed by a message manager as described with reference to FIGS. 12 through 15.

At 2225, the STA may determine an RU allocation for the first content channel based on the first subband. The operations of 2225 may be performed according to the methods described herein. In some examples, aspects of the operations of 2225 may be performed by a message manager as described with reference to FIGS. 12 through 15.

At 2230, the STA may communicate with an access point based on determining the RU allocation for the first content channel. The operations of 2230 may be performed according to the methods described herein. In some examples, aspects of the operations of 2230 may be performed by a message manager as described with reference to FIGS. 12 through 15.

It should be noted that the methods described above describe possible implementations, and that the operations and the steps may be rearranged or otherwise modified and that other implementations are possible. Furthermore, aspects from two or more of the methods may be combined.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a DSP, an ASIC, a FPGA or other PLD, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification may be implemented as software. For example, various functions of components disclosed herein or various blocks or steps of a method, operation, process or algorithm disclosed herein may be implemented as one or more modules of one or more computer programs. Such computer programs may include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as GSM. An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communication system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (for example, waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also may be implemented in combination in a single implementation. Conversely, various features that are described in the context of a single implementation also may be implemented in multiple implementations separately or in any suitable subcombination. As such, although features may be described above as acting in particular combinations, and even initially claimed as such, one or more features from a claimed combination may in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted may be incorporated in the example processes that are schematically illustrated. For example, one or more additional operations may be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

What is claimed is:

1. A method for wireless communication performed by a wireless communication device, comprising:
   receiving a message allocating resources for communication with an access point;
   determining a compression mode of at least a portion of the message;
   determining a starting spatial stream allocated to the wireless communication device by the message based at least in part on the compression mode, wherein an indication of the starting spatial stream is included the message based at least in part on the portion of the message being compressed;
   determining a number of spatial streams allocated to the wireless communication device by the message based at least in part on the compression mode, wherein an indication of the number of spatial streams is included the message based at least in part on the portion of the message being compressed; and
   communicating with the access point based at least in part on the starting spatial stream and the number of spatial streams allocated to the wireless communication device by the message.

2. The method of claim 1, further comprising:
   identifying a starting spatial stream field in the message, wherein determining the starting spatial stream includes identifying the starting spatial stream based at least in part on the starting spatial stream field.

3. The method of claim 1, further comprising:
   identifying a spatial stream number field in the message, wherein determining the number of spatial streams includes identifying the number of spatial streams based at least in part on the spatial stream number field.

4. The method of claim 1, further comprising:
   determining that the message comprises an extreme high throughput (EHT) message, wherein determining the starting spatial stream and determining the number of spatial streams is based at least in part on determining that the message is the EHT message.

5. The method of claim 4, further comprising:
interpreting the message based at least in part on the message being the EHT message and the compression mode.

6. The method of claim 1, wherein the message includes a user-specific field for allocating multiple-user multiple-input multiple-output (MU-MIMO) resources to the wireless communication device, the user-specific field including:
a station identifier field that identifies the wireless communication device;
a modulation and coding scheme (MCS) field;
a starting spatial stream field that indicates the starting spatial stream allocated to the wireless communication device; and
a spatial stream number field that indicates the number of spatial streams allocated to the wireless communication device.

7. The method of claim 6, wherein the starting spatial stream field comprises four bits.

8. The method of claim 6, wherein the spatial stream number field comprises two bits.

9. The method of claim 6, wherein the user-specific field comprises a portion of a SIG-B field of a multiple user physical layer convergence procedure protocol data unit (MU PPDU).

10. The method of claim 1, wherein the portion of the message is a SIG-B field.

11. The method of claim 10, further comprising:
determining that a SIG-B common field is absent from the message based at least in part on the compression mode of the message.

12. The method of claim 1, further comprising:
determining that a coding field is absent from a user-specific field of the message associated with the wireless communication device based at least in part on the message being an extreme high throughput (EHT) message and the compression mode; and
determining that the resources use a low-density parity-check code (LDPC) based at least in part on determining that the message the coding field is absent from the message, wherein communicating with the access point is based at least in part on determining that the resources use the LDPC.

13. The method of claim 1, further comprising:
determining that a bandwidth of the resources being allocated by the message exceeds 160 MHz, wherein determining the starting spatial stream and determining the number of spatial streams is based at least in part on determining that the bandwidth of the resources being allocated by the message exceeds 160 MHz.

14. The method of claim 1, further comprising:
determining that a number of wireless communication devices being allocated resources by the message exceeds eight wireless communication devices, wherein determining the starting spatial stream and determining the number of spatial streams is based at least in part on determining that the number of wireless communication devices being allocated resources by the message exceeds eight wireless communication devices.

15. The method of claim 1, further comprising:
determining that a number of spatial streams allocatable by the message exceeds eight spatial streams, wherein determining the starting spatial stream and determining the number of spatial streams is based at least in part on determining that the number of spatial streams allocatable by the message exceeds eight spatial streams.

16. A method for wireless communication performed by a wireless communication device, comprising:
receiving an extreme high throughput (EHT) message allocating resources for communication with an access point using a bandwidth;
determining that the EHT message includes a SIG-B common field comprising a plurality of content channels;
identifying information included in each content channel of the plurality of content channels based at least in part on the EHT message including the SIG-B common field, each content channel spanning a frequency segment, the frequency segment equal to or exceeding 20 MHz of the bandwidth based at least in part on a determination that the bandwidth is equal to or greater than a bandwidth threshold, the bandwidth threshold being 160 MHz, wherein a quantity of content channels associated with the resources for communication increases based at least in part on the bandwidth being equal to or greater than the bandwidth threshold; and
communicating with the access point based at least in part on identifying the information included in each content channel of the plurality of content channels.

17. The method of claim 16, further comprising:
determining the frequency segment spanned by each content channel of the plurality of content channels, wherein identifying the information included in each content channel is based at least in part on determining the frequency segment.

18. The method of claim 16, wherein the frequency segment spanned by each content channel of the plurality of content channels is 40 MHz.

19. The method of claim 16, further comprising:
determining whether a number of tones in a resource unit (RU) satisfies a threshold; and
applying multiple-user multiple-input multiple-output (MU-MIMO) to the RU that satisfies the threshold.

20. The method of claim 19, wherein the threshold comprises 242 tones.

21. The method of claim 16, further comprising:
determining a compression mode of the EHT message, wherein determining that the EHT message include the SIG-B common field is based at least in part on determining the compression mode.

22. The method of claim 21, further comprising:
interpreting the EHT message based at least in part on the compression mode; and
determining a number of spatial streams allocated to the wireless communication device by the EHT message based at least in part on the interpretation, wherein determining that the EHT message include the SIG-B common field is based at least in part on determining the number of spatial streams.

23. The method of claim 16, further comprising:
determining that the bandwidth of the resources being allocated by the EHT message exceeds 160 MHz, wherein identifying the information included in each content channel of the plurality of content channels is based at least in part on determining that the bandwidth of the resources being allocated by the EHT message exceeds 160 MHz.

24. The method of claim 16, further comprising:
determining a portion of a resource unit (RU) allocation table associated with the EHT message, wherein identifying the information included in each content channel is based at least in part on the portion of the RU allocation table associated with the EHT message.

25. The method of claim 16, wherein the EHT message includes a user-specific field for allocating the resources to the wireless communication device, the user-specific field including:
- a station identifier field that identifies the wireless communication device;
- a beamforming field;
- a modulation and coding scheme (MCS) field;
- a dual code modulation field; and
- a spatial stream field that indicates a number of spatial streams allocated to the wireless communication device.

26. The method of claim 16, wherein the EHT message includes a user-specific field for allocating non-multiple user multiple in multiple out (non-MU-MIMO) resources to the wireless communication device, the user-specific field including:
- a station identifier field that identifies the wireless communication device;
- a beamforming field;
- a modulation and coding scheme (MCS) field;
- a coding field; and
- a spatial stream field that indicates a number of spatial streams allocated to the wireless communication device.

27. The method of claim 16, further comprising:
determining that the bandwidth of the resources being allocated by the EHT message is equal to or less than 160 MHz, wherein identifying the information included in each content channel of the plurality of content channels is based at least in part on determining that the bandwidth of the resources being allocated by the EHT message is equal to or less than 160 MHz.

28. The method of claim 16, further comprising:
determining that a number of spatial streams allocatable by the EHT message exceeds eight spatial streams, wherein identifying the information included in each content channel of the plurality of content channels is based at least in part on determining that the number of spatial streams allocatable by the EHT message exceeds eight spatial streams.

29. An apparatus for wireless communication, comprising: a processor, a memory in electronic communication with the processor; and instructions stored in the memory and executable by the processor to cause the apparatus to:
- receive a message allocating resources for communication with an access point;
- determine a compression mode of at least a portion of the message;
- determine a starting spatial stream allocated to a wireless communication device by the message based at least in part on the compression mode, wherein an indication of the starting spatial stream is included the message based at least in part on the portion of the message being compressed;
- determine a number of spatial streams allocated to the wireless communication device by the message based at least in part on the compression mode, wherein an indication of the number of spatial streams is included the message based at least in part on the portion of the message being compressed; and
- communicate with the access point based at least in part on the starting spatial stream and the number of spatial streams allocated to the wireless communication device by the message.

30. An apparatus for wireless communication, comprising: a processor, a memory in electronic communication with the processor; and instructions stored in the memory and executable by the processor to cause the apparatus to:
- receive an extreme high throughput (EHT) message allocating resources for communication with an access point using a bandwidth;
- determine that the EHT message includes a SIG-B common field comprising a plurality of content channels;
- identify information included in each content channel of the plurality of content channels based at least in part on the EHT message including the SIG-B common field, each content channel spanning a frequency segment, the frequency segment equal to or exceeding 20 MHz of the bandwidth based at least in part on a determination that the bandwidth is equal to or greater than a bandwidth threshold, the bandwidth threshold being 160 MHz, wherein a quantity of content channels associated with the resources for communication increases based at least in part on the bandwidth being equal to or greater than the bandwidth threshold; and
- communicate with the access point based at least in part on identifying the information included in each content channel of the plurality of content channels.

* * * * *

UNITED STATES PATENT AND TRADEMARK OFFICE
CERTIFICATE OF CORRECTION

PATENT NO. : 11,272,490 B2
APPLICATION NO. : 16/402492
DATED : March 8, 2022
INVENTOR(S) : Verma et al.

Page 1 of 1

It is certified that error appears in the above-identified patent and that said Letters Patent is hereby corrected as shown below:

In the Claims

Claim 1, Column 50, Line 39 should read:
"indication of the starting spatial stream is included in the"

Claim 1, Column 50, Line 46 should read:
"in the message based at least in part on the portion of the"

Claim 29, Column 54, Line 8 should read:
"the starting spatial stream is included in the message"

Claim 29, Column 54, Line 15 should read:
"in the message based at least in part on the portion of the"

Signed and Sealed this
Thirtieth Day of September, 2025

John A. Squires
*Director of the United States Patent and Trademark Office*